United States Patent [19]

Fischer et al.

[11] Patent Number: 4,709,395
[45] Date of Patent: Nov. 24, 1987

[54] METHOD AND APPARATUS FOR MINIMIZING ERRORS IN THE DIGITAL PROCESSING OF ELECTRICAL SIGNALS

[75] Inventors: Gerhard Fischer, Offenbach; Karl R. Scheuter, Darmstadt, both of Fed. Rep. of Germany

[73] Assignee: Dr.-Ing. Rudolf Hell GmbH, Fed. Rep. of Germany

[21] Appl. No.: 631,772

[22] Filed: Jul. 17, 1984

[30] Foreign Application Priority Data

Jul. 29, 1983 [EP] European Pat. Off. ........ 83107477.8

[51] Int. Cl.$^4$ ............................................. G06K 9/40
[52] U.S. Cl. ........................................ 382/54; 358/163; 358/283; 371/30; 382/57
[58] Field of Search ................. 382/50, 52, 57, 54; 358/283, 298, 163; 371/24, 30

[56] References Cited

U.S. PATENT DOCUMENTS

| | | | |
|---|---|---|---|
| 4,150,400 | 4/1979 | Wong | 358/260 |
| 4,196,452 | 4/1980 | Warren et al. | 358/283 |
| 4,366,507 | 12/1982 | Mori | 358/283 |
| 4,482,923 | 11/1984 | Fischer et al. | 358/283 |
| 4,485,397 | 11/1984 | Scheuter et al. | 358/283 |
| 4,586,082 | 4/1986 | Wilkinson | 382/52 |

FOREIGN PATENT DOCUMENTS 2011759 6/1979 United Kingdom .

OTHER PUBLICATIONS

"MECCA", Habilitation Dissertation by Peter Stucki at Faculty of Jurisprudence and Political Science of the University of Zurich, 1981, pp. 14 and 15.

Primary Examiner—David K. Moore
Assistant Examiner—Jacqueline Todd
Attorney, Agent, or Firm—Hill, Van Santen, Steadman & Simpson

[57] ABSTRACT

A method and apparatus for minimizing errors in digital processing of electrical signals whereby a digital input signal is divided into a digital useful signal having a lower resolution than the input signal and into a digital error signal having lower resolution than the input signal. A deviation of the useful signal is reproduced from the input signal and a check is performed to see whether the sum error of a plurality of successive useful signal values crosses a prescribed upper or lower threshold. When a threshold is crossed, an error value of the useful signal which comes closest to this threshold is identified and the useful signal and the error signal of this signal value are corrected such that the sum error no longer crosses the threshold.

13 Claims, 23 Drawing Figures

|     |     |     |
| --- | --- | --- |
| 139 | 145 | 144 |
| 147 | 128 | 132 |
| 131 | 129 | 133 |

~31

32a

|   |   |   |
|---|---|---|
| 9 | 9 | 9 |
| 9 | 8 | 8 |
| 8 | 8 | 8 |

32b

|     |     |     |
| --- | --- | --- |
| +5  | -1  | ±0  |
| -3  | ±0  | -4  |
| -3  | -1  | -5  |

32c

- 12

33a

|   |   |   |
|---|---|---|
| 9 | 9 | 9 |
| 9 | 8 | 8 |
| 8 | 8 | 9 |

33b

|     |     |     |
| --- | --- | --- |
| +5  | -1  | ±0  |
| -3  | ±0  | -4  |
| -3  | -1  | +11 |

| VA | 139 | 140 | 144 | 141 | 137 | 128 | 132 | 138 | 131 | 129 | 133 | 130 | 131 | 125 | 134 | 135 |
|---|---|---|---|---|---|---|---|---|---|---|---|---|---|---|---|---|
| VD | 9 | 9 | 9 | 9 | 9 | 8 | 8 | 9 | 8 | 8 | 8 | 8 | 8 | 8 | 8 | 8 |
| VF | +5 | +4 | 0 | +3 | +7 | 0 | -4 | +6 | -3 | -1 | -5 | -2 | -3 | +3 | -6 | -7 |
| VA1 | +9 | | +3 | | +7 | | +2 | | -4 | | -7 | | 0 | | -13 | |
| VA2 | +12 | | | | +9 | | | | -11 | | | | -13 | | | |
| VA3 | +21 | | | | | | | | -24 | | | | | | | |
| VA4 | -3 | | | | | | | | | | | | | | | |

Fig. 5b

| VA4 | -3 | | | | | | | | | | | | | | | |
|---|---|---|---|---|---|---|---|---|---|---|---|---|---|---|---|---|
| VA3 | +5 | | | | | | | | -8 | | | | | | | |
| VA2 | -4 | | | | +9 | | | | -11 | | | | +3 | | | |
| VA1 | -7 | | 0 | | +3 | | +7 | | +2 | | -4 | | -7 | | 0 | | +3 | | +9 | |
| VF | -11 | +4 | 0 | +3 | +7 | 0 | -4 | +6 | -3 | -1 | -5 | -2 | -3 | +3 | -6 | +9 |
| VD | 8 | 9 | 9 | 9 | 9 | 8 | 8 | 9 | 8 | 8 | 8 | 8 | 8 | 8 | 8 | 9 | and apparatus for minimizing errors in the digital processing of electrical signals

METHOD AND APPARATUS FOR MINIMIZING ERRORS IN THE DIGITAL PROCESSING OF ELECTRICAL SIGNALS

BACKGROUND OF THE INVENTION

The invention relates to a method and to an apparatus for minimizing errors in the digital processing of electrical signals, in particular for filtering sequences or groups of noise-infested signals which are digitally further processed, whereby the disturbances generated by the digital stages are minimized.

Filters for the elimination of irrelevant information or interference are already known which are employed, for example, in the following case. When, for example, one wishes to record an event space X and determines that the event space Y which has been acquired and imaged instead differs at least partially from the event space X, then two types of disturbances are decisive.

Given the acquisition of the event space X which consists of a plurality of discriminatable events $x_i$, first random disturbances which superimpose on the events $x_i$ can also be registered in addition to these events $x_i$. Instead of the event space X, the disturbed event space X* already exists after the acquisition.

Viewed in isolation from the remaining events of this space, a group of identical events $x_i$ of the event space X has no informational content because these events do not differ from one another. When, however, noise events randomly superimpose on this group of identical events, then the informational content of the group increases as a consequence of the disturbances and discriminatable events $x_j^*$ thus arise therefrom. Accordingly, the number of events which can be discriminated overall in the disturbed event space X* is greater than in the event space X.

Second, further disturbances can occur given the imaging of the disturbed event space X* in the event space Y since the plurality of events $y_k$ which can be discriminated in the event space X is limited for physical or economic reasons. The acquired events $x_j^*$ of the disturbed event space X* are imaged in the events $y_k$ of the event space Y. Normally, the plurality of discriminatable events in the imaged event space Y is then smaller again than in the acquired, disturbed event space X*. The disturbances contained in the event space X* are therefore partially amplified in the event space Y and only partially suppressed. The noise events that were usually still statistically distributed before in the ideal case thus largely lose their statistical distribution.

In many applications, the events $y_k$ of the imaged event space Y are digital data; the number of digital stages is the number of discriminatable events at the same time.

The disturbances arising in the registration can randomly accumulate, particularly when recording sequences or groups of noise-infested signals by means of digital data. Normally, these accumulations only extend over small registration regions. In practice, for example in image processing, however, they have a significantly more disturbing effect than individual, random recording errors.

It is therefore an object to keep the recording errors caused by the digitalization as low as possible by means of a corresponding filter and to reliably limit the maximum occurring recording errors.

It is known for this purpose to equip the event space Y with so many events, for example digital levels, that the recording errors are largely, though not definitely avoidable. Frequently, however, this is not possible to an adequate degree or is simply uneconomical.

Above and beyond this, some methods are known from the field of digital image processing for the filtration of image data which filter out the respectively desired information from noisy image data, the desired information being the characterized by specific features (e.g., Informatik Fachberichte No. 20, DAGM Symposium, Karlsruhe, Springer Verlag 1979, incorporated herein by reference). Methods for the reduction of the digitalization errors occurring in digital image processing are also known which sum up the recording errors of the individual image points and initiate a correction at individual image points or picture elements given crossing of a limiting error threshold. The addition of the recording errors thus occurs along a line which either serves for line-by-line image scanning (DE-OS No. 23 63 460, DE-OS No. 28 12 821, corresponding to U.S. Pat. No. 4,150,400 both incorporated herein by reference) or which sweeps a matrix of scanning points corresponding to a section of the image by scanning said matrix line-by-line ("MECCA" habilitation dissertation by Peter Stucki at Faculty of Jurisprudence and Political Science of the University of Zurich, 1981).

Methods are also known in order to digitally reproduce image parts having the same or approximately the same tonal value within image sections (DE-OS No. 29 31 098, EP-OS No. 0 074 422, corresponding to U.S. Ser. No. 245,643 and U.S. Ser. No. 413,216 both incorporated herein by reference).

The individual methods for filtering and avoiding recording errors, however, are not matched to one another and can hardly be combined with one another. This leads, for example, to the fact that digital image reproduction is usually executed either without filters and only with correction of recording errors along a picture line, or that only specific information, for example edges, are filtered out of the image data. Considerable and, therefore, visually perceptible recording errors can, for example, arise in both instances.

SUMMARY OF THE INVENTION

It is therefore an object of the invention to reduce the disturbances caused by the allocation in the digitally recorded event space Y sufficiently so that as small as possible a selection of events $y_k$ suffices for recording the corresponding disturbed events $x_j^*$ with desired precision.

This object is achieved according to the invention in that the signals arising in the scanning are first directly digitally recorded for each scanned spot in accordance with the desired precision, and a possible accumulation of the disturbances caused by the digitization is prevented by providing that:

the recording error which has arisen due to the digitization is stored for every scanned spot or point;

chronologically or topically adjacent scanned points are combined in scan zones or matrixes whose mean scan signal is formed and digitized, whereby more digital levels are allocated to these scan zones in accordance with the combination;

the density levels initially recorded for the individual scan spots are modified under certain given conditions so that the digital levels of the scan zones coincide with their mean scan signals in accordance with the desired recording precision;

neighboring scan zones are combined into scan regions and the above-described correction is executed for the scan regions; and the interaction method arising by means of step-by-step combination and corresponding correction is terminated when the desired recording precision is observed within the correction region that has arisen due to the combinations.

One advantage of the invention is that the inventive filtering method prevents the appearance of accumulated recording errors. The maximum remaining recording error is defined and can be employed for the identification of the number of digital steps that is required for achieving the desired recording precision. Other attainable advantages are that the image signals are only filtered when they cannot be digitally recorded disturbance-free without filtration, that they are only filtered to such degree that their recording error is eliminated, except for the residual error prescribed by the digital steps. A further advantage is that the filtering method of the invention is largely compatible with visual perception, so that good acceptance is anticipated.

BRIEF DESCRIPTION OF THE DRAWINGS

FIG. 3 is an illustrative application for the single-step filtration according to FIG. 2 of data of a two-dimensional data grid;

FIG. 4 is an illustrative application for two-step filtration according to FIG. 2 of data of a two-dimensional data grid;

FIGS. 5a and 5b are an illustrative application of four-step filtration according to FIG. 2 of data of a one-dimensional data grid;

DESCRIPTION OF THE PREFERRED EMBODIMENTS

Figure 1:
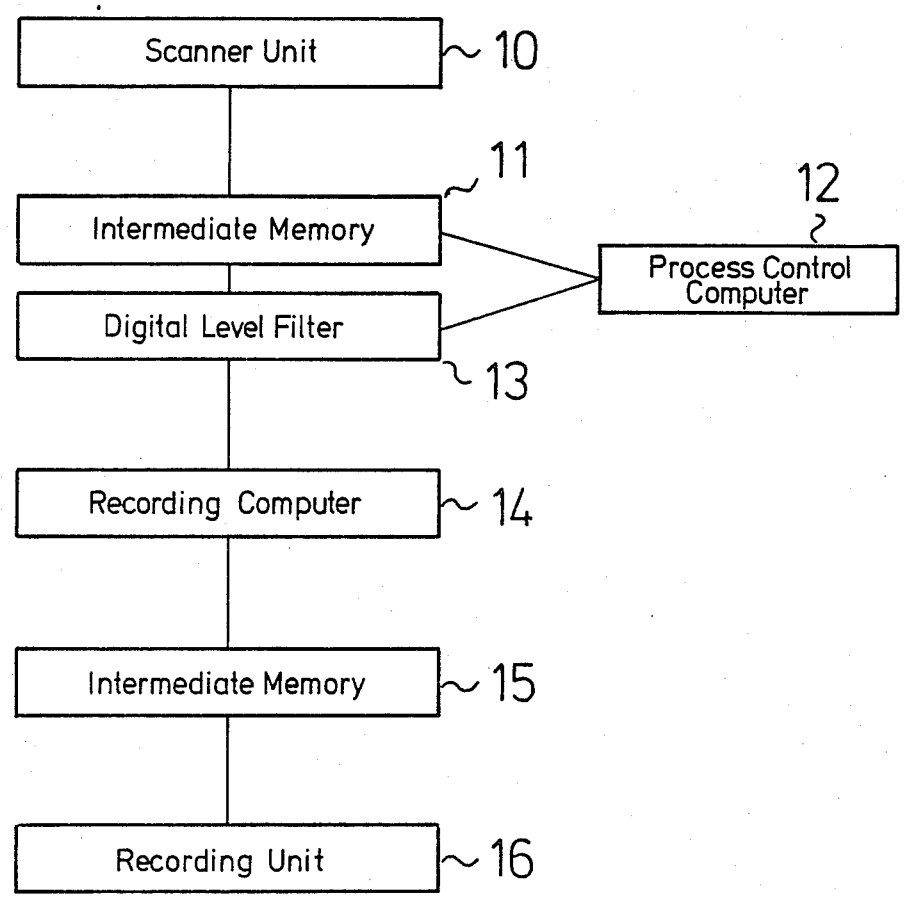
FIG. 1 is a block diagram for the use of the apparatus of the invention in a reproduction process.

FIG. 1 shows an example for the application of the filter of the invention referred to as a digital level filter, in reproduction technology. The density values of the original image are scanned in the scanner unit 10 and are also potentially edited so that the output signals of the scanner unit correspond to the desired density levels. The known scanner which partially comprises color and correction computers as well as analog-to-digital converters can be utilized as the scanner unit. However, a video camera or some other opto-electronic transducer can also serve as the scanner unit as well, and the output signal of the scanner unit can be present in analog or digital form.

The scanner unit 10 can be connected to an intermediate memory 11 which can in turn be connected to the digital level filter 13 of the invention as well as to a process control computer 12. The process control computer controls the data transport and can also be a possibility for input itself for modifying the image data. The apparatus, however, is also useful without an intermediate memory and process control computer when, in a corresponding embodiment of the apparatus of the invention, its input is matched to the output of the scanner unit.

The digital level filter 13 of the invention is connected to a recording computer 14 which, for example, can call a distribution or arrangement of elementary areas to be exposed or printed which corresponds to the digital level from a memory or can calculate it itself.

The distribution is subsequently transferred to an intermediate memory 15. The intermediate memory, however, is not directly related to the integration of the invention and can be eliminated when desired.

The assemblies 11 through 15 can be combined in a known manner to form a work station, for example the system CHROMACOM of Dr. Hell GmbH, Kiel, Germany, incorporated herein by reference.

The intermediate memory 15 is followed in a known manner by another recording unit 16. Every device that permits a two-dimensional data recording in digital form, for example a scanner or a printer or a monitor, can be employed as the recording unit in the exemplary arrangement.

Figure 2:
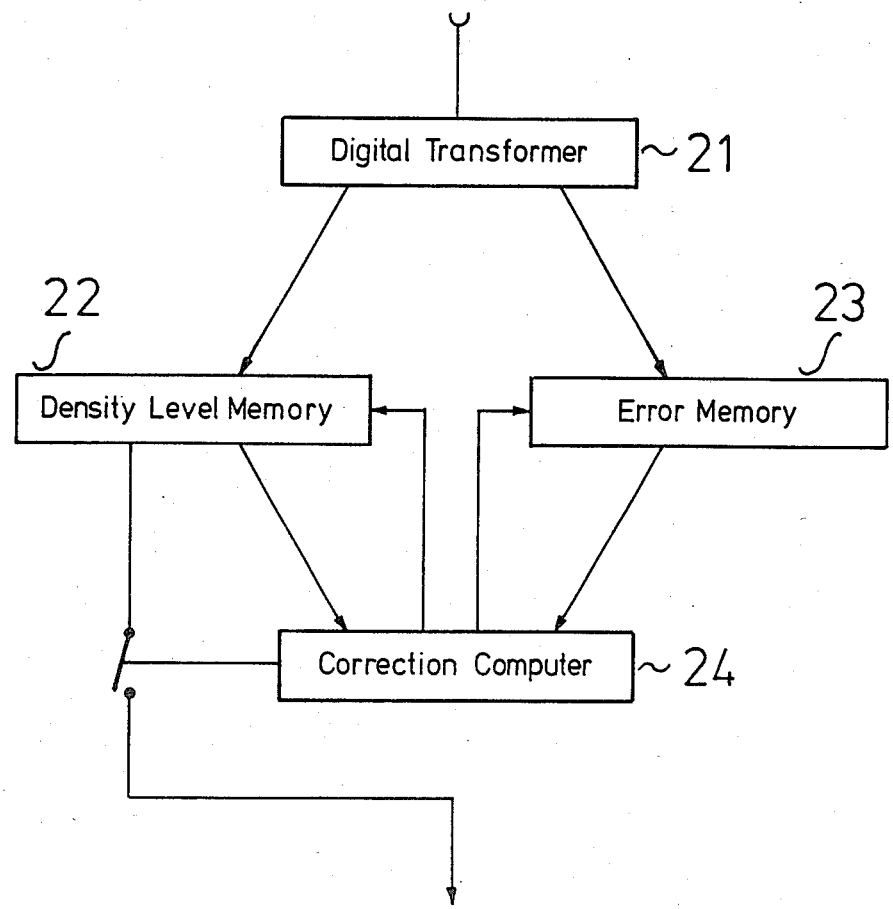
FIG. 2 is a block diagram of the apparatus of the invention.

FIG. 2 shows the block diagram of a simple embodiment of the digital level filter apparatus of the invention.

The density values (digital input signals) corresponding to a scan region are taken directly from an intermediate memory or from a scanner unit and are supplied to the digital transformer 21. This unit calculates the digital level which corresponds to the density level at the record side (useful digital signal) and calculates the error by which the density level deviates from the scan signal (digital error signal). The digital level and error are both calculated from the scan signal and for each image point or picture element. The digital transformer can contain an analog-to-digital converter in case the image data pass into the density level computer in analog form. It then can be further comprised of a digital computer, or of an analog computer and output signals which are then subsequently digitized. The following is an example. The density values of the intermediate memory 11 in FIG. 1 can be digitized with an 8 bit resolution, i.e. in 256 levels, and the scanning can occur in squares having a side length of 125 μm corresponding to a raster square of a point raster having the number of grid lines $r_z = 80$ lines/cm. The area of the very small points to be printed would then amount, for example, to $30 \times 30$ μm² in the reproduction, so that 16 density levels per scanning point could thus be reproduced. Let, for example, the density level of a scanning point amount to 139. It is then the job of the digital transformer to calculate the density level at the reproduction side and the corresponding error for every recording point.

The density level $D_R$ at the reproduction side results from the possible density levels of the scanning (0, 1, 2, ... 255) and of the reproduction (0, 1, 2,... 16). From the scan result, the following is derived:

$$D_{Ra} = 132 \cdot 16/255 = 8.7216 \text{ and, therefrom, } D_R = 9.$$

As the error signal, the relative error can, for example, be calculated at $$D = \left( \frac{9 - 8.7216}{16} \right) \times 100 = +1.74\%,$$

or an absolute error $F_A$ corresponding thereto can be calculated as $$F_A = (9 \cdot 16) - 139 = +5.$$

As one can see, the density level at the reproduction side which lies closest to the scan result 139 is the density level 9 which, however, would correspond to the scan result $9 \times 16 = 144$. The absolute error $F_A$ thus indicates that the scan result 139 can only be reproduced in falsified manner by accepting an absolute error of +5:

$$(139+5):16=9$$

in the example selected, the absolute error can assume values of $-7, -6, \ldots 0, 1 \ldots 6, 7, 8$.

The calculation of the density level at the reproduction side and of the corresponding error can also occur according to a characteristic, for example the density characteristic at the reproduction side (density as a function of the degree of surface coverage given the selected point size), or with the assistance of a memory from which the density level at the reproduction side which corresponds to the desired density level is obtained.

From the error memory 23, the error signals proceed to a correction computer 24 which calculates the accumulated error (error sum) of a plurality (group) of scan points (for example, 9) and which modifies the density levels stored in the density level memory (digital useful signals) until the accumulated error is sufficiently small, i.e. is within the desired recording precision. In this case, $9 \times 16 = 144$ density levels are reproducible on the corresponding reproduction area or surface and the accumulated error amounts at most to half a density level, i.e. 1/288 of a density level (corresponds to 0.34%).

When the accumulated error of the scan region lies beyond the error region or range described for the individual scan point, then a correction which corresponds to a low-pass filtering can be executed. The correction procedure shall be explained in greater detail below with reference to a few figures cited hereafter.

When the accumulated error has been sufficiently reduced, the digital image data stored in the density level memory 22 in FIG. 2 are forwarded to, for example, the recording computer 14 in FIG. 1.

FIG. 3 shows an exemplary embodiment of the filtering method of the invention. The density values acquired in the scanning (digital input signals) are compiled in the matrix 31. From this, first the corresponding density level matrix 32a and the error matrix 32b, and finally the accumulated error of the scan region 32c, are calculated. Accordingly, the density level matrix 33a and the corresponding error matrix 33b arise with a single-step correction, and finally the accumulated error 33c is minimal.

As described above, the density values of the scan matrix 31 have been acquired, for example, in 256 density levels and only 16 density levels can, for example, now be recorded per scan point. The density level $D_R$ at the reproduction side and the absolute error $F_A$ can be determined therefrom for every scan point (see description to FIG. 2), so that the respective density level can be transferred into a matrix 32a and the corresponding absolute error can be transferred into a matrix 32b.

The accumulated error of the scan region 32c $(5-1+0-3-0-4-3-1-5=-12)$ arises as the sum of all absolute errors of the error matrix. Since it lies beyond the range $\{-7, -6, \ldots 7, 8\}$, a correction can be executed, whereby the mean density of the scan region is correctly reproduced in that, for example, one of the scan points is given a different density level than the density level calculated above.

For this purpose the density level of a scan point can be increased, for example, by one level. As a result thereof, the corresponding absolute error is increased by +16, as is the accumulated error of the scan region.

Every scan point can continue to be transmitted with the smallest possible error, a point having as large as possible a negative error ($-5$) is preferably selected for correction.

The correction can also affect a plurality of scan points (for example 3) when the accumulated error is correspondingly high (for example $-43$).

The density level matrix 33a, the corresponding error matrix 33b, and the accumulated error 33c arise as a result of the correction.

Figure 4:
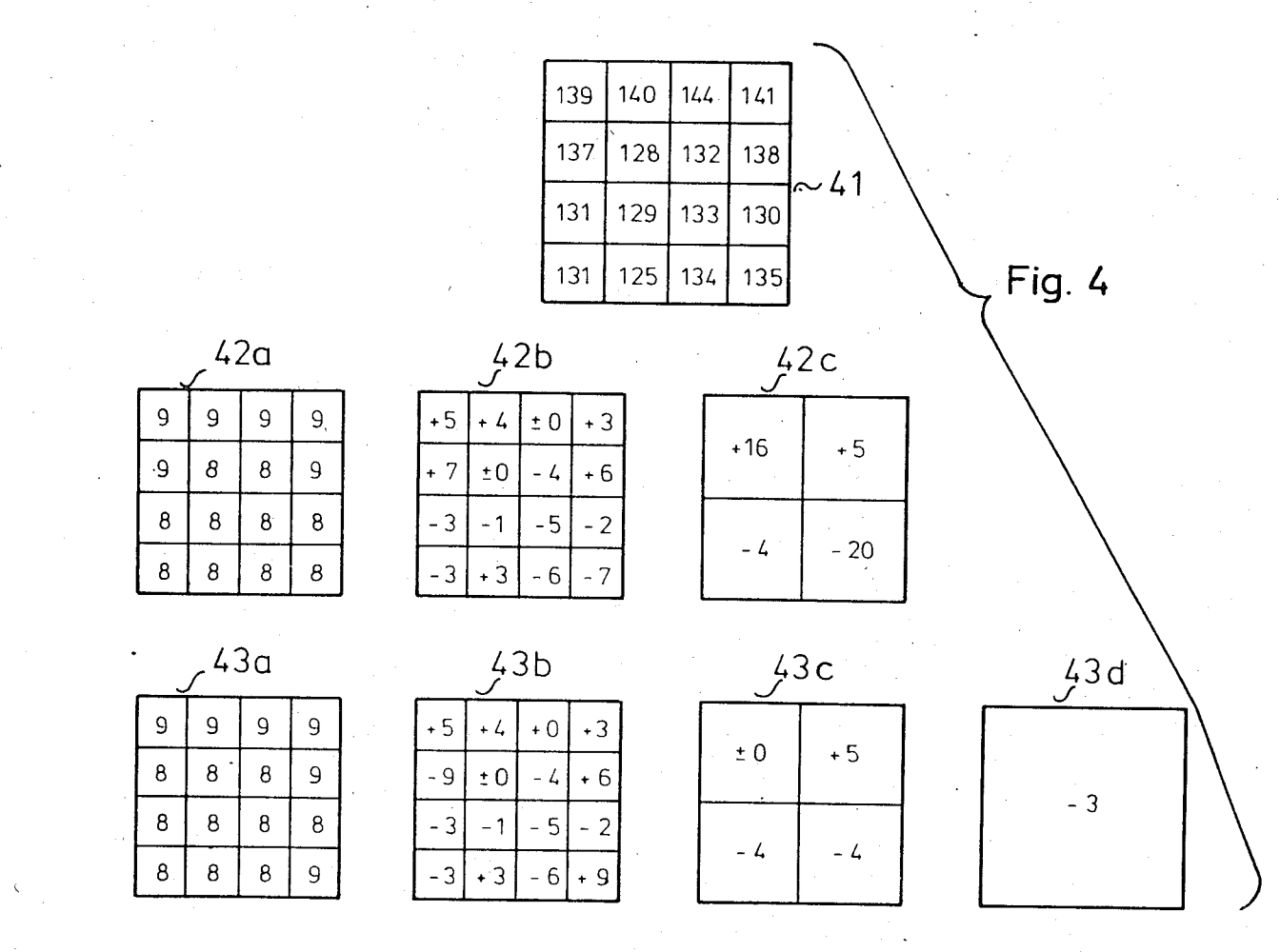

FIG. 4 shows an illustrative application whereby the correction described with reference to FIG. 3 is executed in two steps. The density values of an exemplary scan region are compiled in a matrix 41.

As described above, the density levels of the reproduction side are calculated therefrom and compiled in the matrix 42a. The matrix 42b contains the respective absolute or actual errors. The accumulated errors of four scan points are contained in the matrix 42c (for example, $5+4+7+0=16$).

The correction procedure has already been described in FIG. 3. Due to the application thereof, the matrices 43a-d arise in the example selected, whereby the corrected density level matrix is present in 43a, the corresponding error matrix is present in 43b, the accumulated error matrix 43c, and finally the accumulated error of the scan region in 43d. Since this lies within the range {−7, −6, . . . 7, 8}, the second correction step cannot be executed in this case. The embodiments illustrated with reference to FIGS. 3 and 4 are particularly distinguished by their simple basic structure.

Also, the inventive filtering method is employable for multi-step and multi-dimensional correction. FIGS. 5a and 5b show an illustrative application for four-step raster-linked correction. FIG. 5a shows the noise-infested scan results in tabular form which are referred to in accordance with their single-dimensional character as a vector of the scan results VA and can, for example, be density values that have been registered along a scan line. The second line contains the density level vector VD calculated therefrom and the third line contains the vector of the corresponding digitization error VF. The further lines contain the vectors of the accumulated errors of the individual steps which are ordered as VA1, VA2, VA3, and VA4 corresponding to their step number. Since the accumulated error of the fourth step lies within the range [−7, −6, . . . 7, 8] it is no longer correctable. The accumulated errors of the third step, by contrast, can be diminished since they have different operational signs, are of a correctable size, and are adjacent in accordance with the hierarchic structure of the accumulated error formation. The correction is executed in FIG. 5b, whereby execution is step-by-step in accordance with the step hierarchy for error correction, and the correction is always executed such that the remaining accumulated errors of the corresponding step remain as small as possible. The accumulated errors of the second step cannot be reduced further in the present case because the accumulated error +9 of the second step is allocated to the accumulated error +5 of the third step, but the accumulated error −11 of the second step is allocated to the accumulated error −11 of the third step. Its correction would therefore cause an increase in the corresponding accumulated error of the third step.

Figure 6:
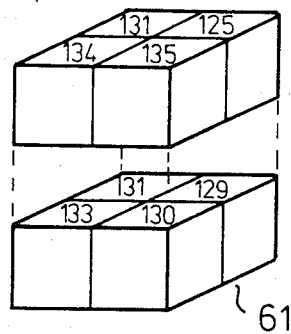
FIG. 6 is an illustrative application for the single-step filtration according to FIG. 2 of data of a three-dimensional data grid.
Figure 6:
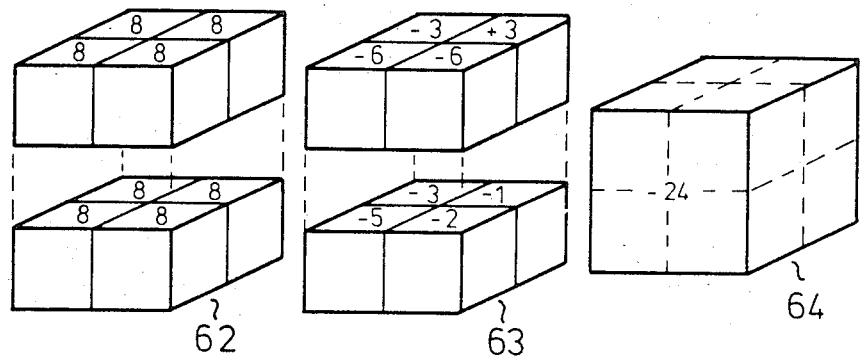
Figure 6:
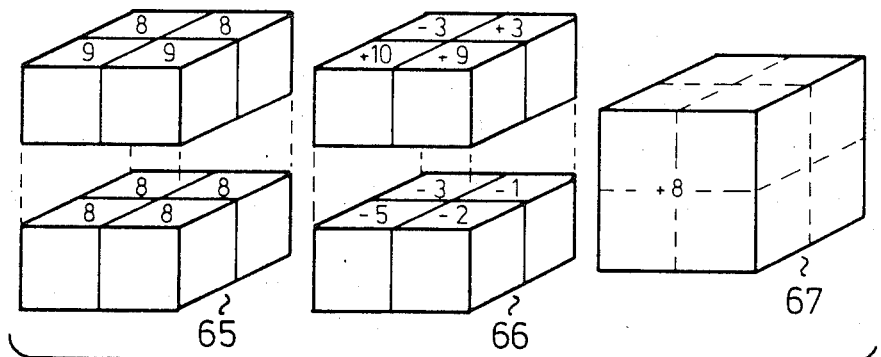

FIG. 6 shows an illustrative application of the singlestep, three-dimensional correction which is employable, for example for filtration for holographic images. The digital level matrix 62 and the error matrix 63 are calculated point-by-point from the data of the scanning matrix 61. The accumulated error at the volume element 4 leads to a correction at two elements. The corrected digital step matrix 65 and error matrix 66 now cause only the accumulated error +8 in 67 which cannot be corrected any further.

Given the execution of the correction procedure in a digital computer, the correction is normally executed as shown in FIG. 5, whereby different hierarchy structures corresponding to the arrangement of the elements in the computer cycle result given a multi-dimensional correction. The filtering method is therefore fundamentally applicable for arbitrarily multi-step and arbitrarily dimensional filtration.

The embodiments of the filtering method shown with reference to FIGS. 3, 4, 5 and 6 are coupled to a prescribed recording grid and therefore still have the disadvantage that the error correction always acts on individual image points or picture elements and the error at the image points or picture elements selected for correction must be slightly enlarged in order to prevent the accumulation of digitization errors.

This disadvantage can be avoided, however, when the hierarchy structures for the correction are not rigidly prescribed. The signal level of the data to be processed—their density level given image data, in general—can, for example, serve as the criterion for the derivation of the hierarchy structure from said data. It is therefore possible to extensively adapt the filtering method of the invention to the data to be processed. The matching of the hierarchy structure to the image data guarantees, for example, that smallest signal differences between the image points or picture elements are preserved so that even fine structures which extend over only a few image points can be imaged in accordance with the desired recording precision.

The embodiments of the filtering method of the invention assembled below are especially suited for the reproduction of at least two-dimensional image data in for example a printing process.

An exemplary embodiment of the method of the invention shall be explained with reference to FIG. 7, whereby the correction is no longer executed for individual scan points but for surface elements consisting of adjacent scan points.

In the cited example, the hierarchy structure corresponds to the surface elements in its first step and to the existing scan region in the second step. The digital levels of the surface elements no longer refer to matrix elements; they must now be more generally referred to, for example, as field elements.

First, the density level matrix 72a and the error matrix 72b have again arisen from the matrix of the scan results 71. Field 72c shows an exemplary combination of a plurality of scan points to form surface elements, whereby one scan point is combined with one or more scan points proximate to it when either the absolute error of at least one of these points is greater than 4 or smaller than −4, and when a correctible accumulated error arises due to the combination, i.e. an error lying outside of the range {−7, −6 . . . 7, 8 } or when the absolute errors of the neighboring points are less than 4 or greater than −4, and the accumulated error comes as close as possible to 0 due to the combination.

As a result of this combination, contour pieces or segments are filtered out of the scan signals which, despite their digital reproduction, now only have a respective digitization error in comparison to the scan signals which is at most, for example, $\pm \frac{1}{2}$ of a very small printable point.

The accumulated error 16, which can be corrected well, thus derives, for example, for the first surface element identified which is composed of three scan points having the errors 5, 4, 7, being corrected when only 26 levels are printed on the surface of the corresponding scan points instead of the calculated 9+9+9=27 levels. The correction procedure itself is therefore unaltered in comparison to that previously marshalled.

Since the correction, however, is not executed for individual scan points as it was previously, but for the identified surface elements, the recording computer—which is connected to the density level computer of the invention according to FIG. 1—must be in a position in this case to distribute the calculated plurality of printing levels over a plurality of scan points (for example, as in the PCT-OS WO No. 81/00466, corresponding to U.S. Ser. No. 245,643 incorporated by reference, whereby the surface elements correspond to the "surface segments having constant mean density").

The corrections of the first step are executed in 73a. 73b shows the corresponding accumulated errors of the first step and deriving therefrom in the manner now disclosed is the accumulated error of the second step 73c which leads to a further correction in the selected example, so that the errors 74a–c arise. In an additional processing step, field 75 can also be formed from field 74a since neighboring surface elements that have the same density level are again combined.

Figure 8:
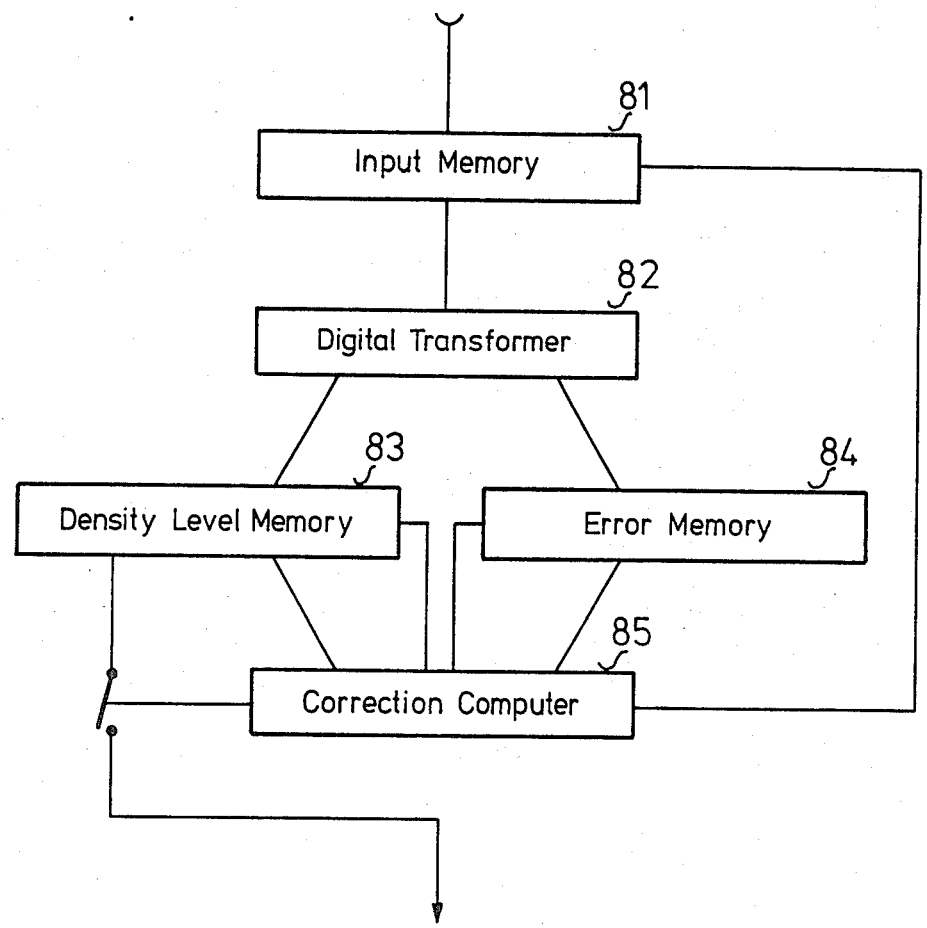
FIG. 8 is a first advantageous improvement of the apparatus of the invention of FIG. 2.

FIG. 8 shows an advantageous further development of the apparatus of the invention which, in comparison to FIG. 2, contains an additional input memory 81 in which the scan signals are preserved during the filtration of the data of the respective scan region. They proceed from there into the digital transformer 82 as well as into the density level memory 83 and the error memory 84. The correction computer 85 now calculates the desired contour segments directly from the data of the input memory 81 instead of from the data of the error matrix, as was previously done. The density levels of the contour segments are then capable of being corrected with the assistance of the inventive method upon incorporation of a density level matrix and error matrix.

Figure 9:
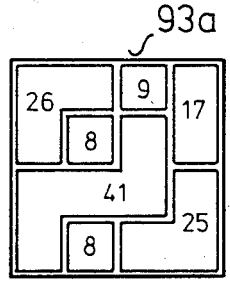
FIG. 9 is an illustrative application for the two-step filtration according to FIG. 8 of data of a two-dimensional data region.
Figure 9:
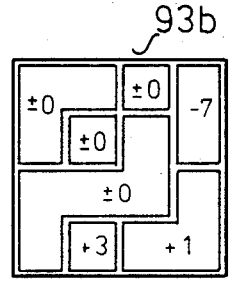
Figure 9:
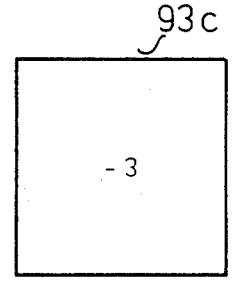

FIG. 9 shows an exemplary application wherein the digital levels lying closest to the scan results are calculated from the matrix of scan results 91 and are combined in the density level matrix 92a, whereby the error matrix 92b has been formed at the same time. 92c shows the combination of scan points with the corresponding accumulated errors which corresponds to the contour segments. The density level field 93a, the accumulated error field 93b, and finally the accumulated error 93c of the scan region arise therefrom by means of the corresponding corrections.

The calculation of the density levels and of the absolute errors has already been shown in the description to FIG. 2. The combination of scan points to form contour segments in 92c has occurred since the scan points proximate to the scan point (for example, having the scan result 139 in 71) are combined with it when their scan results do not differ from that of the scan point by more than a prescribed scatter range (for example, ±4), whereby the combination was terminated before the corresponding sum error became greater than +16 or less than −16, and whereby scan points that were reproducible without error (absolute error 0) were not employed for the combination.

Figure 7:
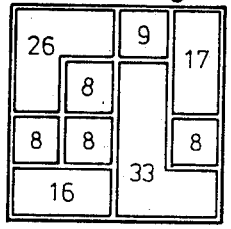
FIG. 7 is an illustrative application for the two-step filtration according to FIG. 2 of data of a two-dimensional data region.

The accumulated errors lead to the correction of the density level of each contour segment 93a, this already having been explained in the description to FIG. 7. 93b shows the corresponding accumulated error field from which the accumulated error 93c of the second stage arises.

Other limits can, of course, also be consulted for the combination of scan points to form contour segments, for example scatter range ±2 and sum error ±32, or the limits can be made "dynamic", for example maximum scatter range ±8 for two neighboring scan points, ±16 for three and four neighboring scan points, ±24 for five through eight neighboring scan points, etc. In particular, these limits can also be adapted to every individual master or original, should this be desirable for aesthetic or economic reasons, for example.

The derivation of the hierarchy structure required for the correction can be varied and matched to every original in the same fashion. For example, the hierarchy structure can also be rigidly prescribed in the first step, as shown in FIG. 4, and can be calculated in the second step from the accumulated errors of the first step. "Dynamizing" the hierarchy structure is likewise possible in that, for example, the number of scan or error data employed for the formation of the respective accumulated error is altered in step-wise fashion.

Figure 10:
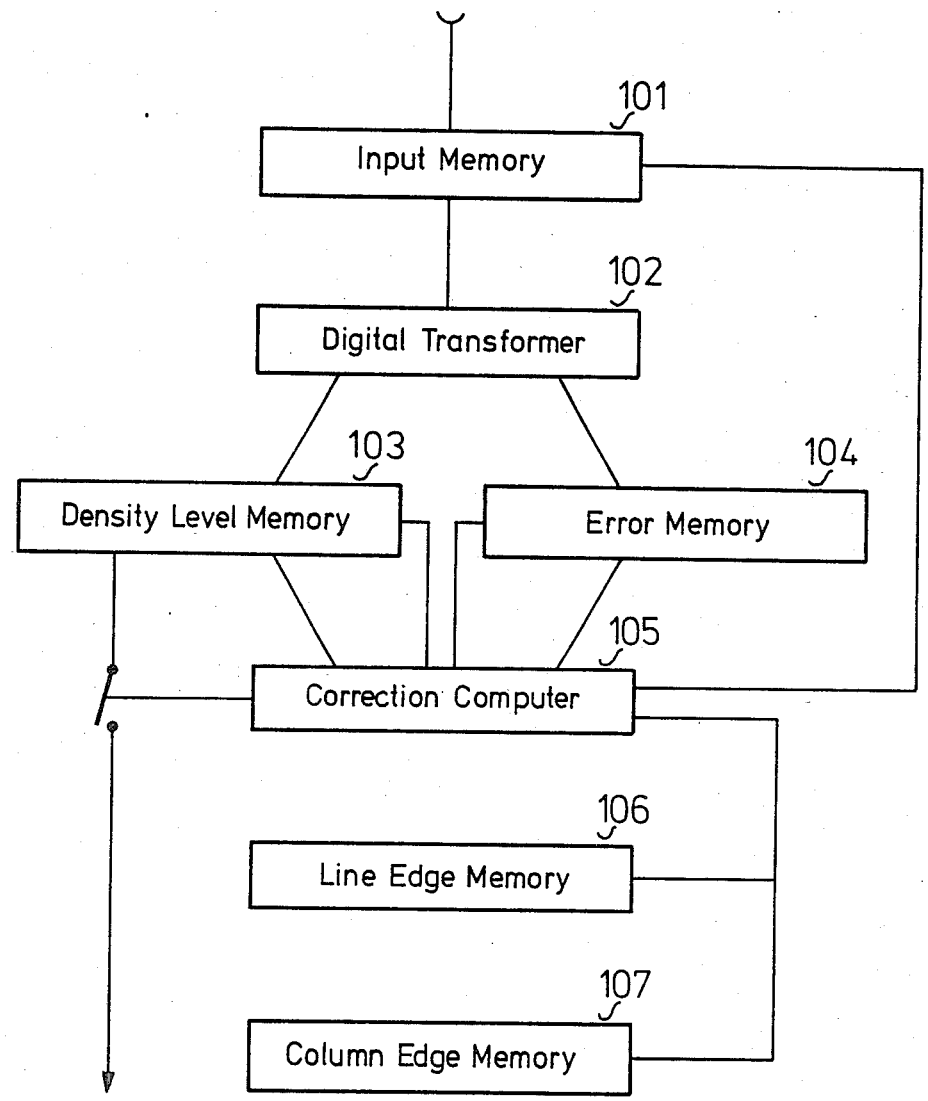
FIG. 10 is a second advantageous improvement of the apparatus of the invention of FIG. 2.

FIG. 10 shows a further, advantageous development of the inventive method which contains additional memories which can store the density levels initially calculated for the edge zones of the scan region so that these can also be involved again in the calculation for the neighboring scan regions. Under given conditions, their accumulated errors can be further reduced by means of combination with scan points of the neighboring scan regions. Thus, for example, the line edge memory 106 can respectively store the lower edge or edges of the scan memory and the column edge memory 107 can, for example, store the respective right-hand column or columns. It is thus guaranteed that the structure of the scan regions cannot have a disruptive effect.

Figure 11:
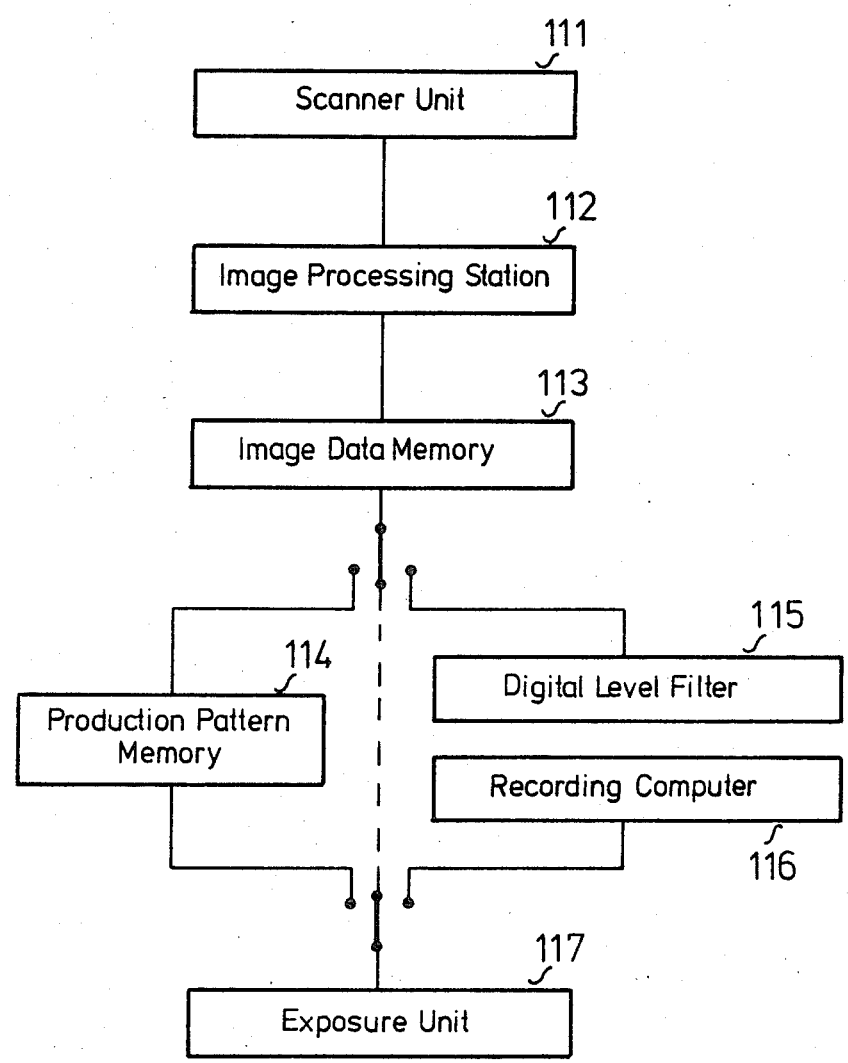
FIG. 11 is a block diagram for the integration of the apparatus of the invention in the reproduction sequence that is presently standard.

FIG. 11 shows an exemplary possibility for the integration of the inventive apparatus in the reproduction process which has the advantage over that shown in FIG. 1 that it can be very simply incorporated into the process sequence as presently practiced. The density values thus acquired in the scanner unit 111 are initially processed in a known manner (112), i.e. are filtered and modified in terms of gradation, are also augmented and replaced by other image data under given conditions, and are stored (113) after they have been processed (for example, in the aforementioned CHROMACOM system). In this case, the image data memory 113 contains the data of the original to be reproduced (after retouching and assembly), so that a decision is only subsequently made as to whether the reproduction is now to occur in analog form, for example with the assistance of a production pattern memory 114, or in digital form, for example with the inventive digital level filter 115 and, following thereupon, with the means 116 known for example, from the PCT-OS WO No. 81/00466, corresponding to U.S. Ser. No. 245,643 incorporated herein by reference, which is referred to as a recording computer here. The image data subsequently proceed to the exposure unit 117.

The original pictures usually have their own inherent color character which is subjectively sensed and which arises in that the "hues" appearing in the original image mutually augment one another to form a "color chord". This color chord can, for instance, be referred to as rest, as dynamic, or as stress, and it is often very important for the reproduction to intensify these impressions or to obtain them despite the relatively slight, reproducible color space. For this purpose, for example, two color separations whose secondary or party colors comprise a quiet progression of an original image can be produced in the traditional reproduction method, whereas the third and, potentially fourth color separation whose progressive colors determine the wealth of detail in the original image can arise in the digital reproduction method. At the same time, the numbers of raster lines of the former color separations can be increased and their angling can be selected in the area of 45° so that the reproduction can no longer be perceived as a matrix image.

The assemblies 114, 115 and 116 can, for example, form an independent sub-system. The assemblies 114, 115 and 116 can also be combined with the exposure unit 117. The image data memory 113 can also be directly connected to the exposure unit or can be combined with the assemblies 114, 115 and 116. The assemblies 114, 115 and 116 can also be directly connected to the image processing station 112 or can be integrated therein. Given this exemplary arrangement, the reproduction method can even be arbitrarily switched between traditional and digital within a color separation by means of corresponding control instructions from the image processing station which can be given by an operator or by a processing program which assists it.

Figure 12:
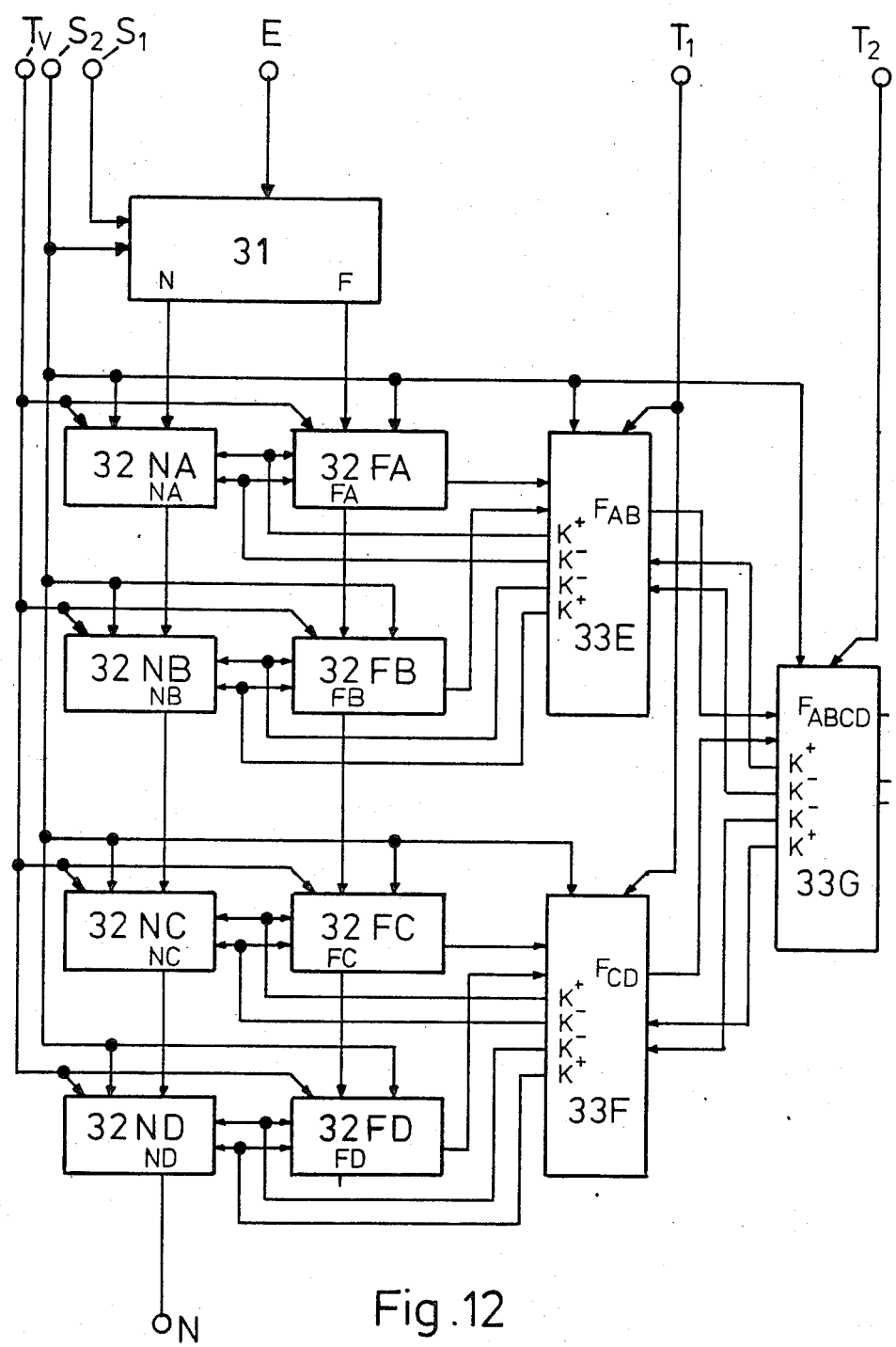
FIG. 12 is a block diagram of a preferred embodiment of the invention.

FIG. 12 shows the block diagram of an exemplary embodiment of the inventive arrangement. The input signal E is divided in the digital transformer 31 into the useful signal N and the error signal F. The resolution of the useful signal is defined by the control signals $S_1$ and $S_2$.

Useful and error signals are transferred to the intermediate memory means 32 xy, whereby the transfer is controlled by means of the clock signal $T_v$. The exemplary embodiment of the inventive apparatus comprises intermediate memory means for the useful signal 32 Ny and intermediate memory means for the error signal 32 Fy and comprises four processing steps A, B, C and D having the corresponding intermediate memory means 32 xA through 32 xD. The intermediate memory means 32 xy comprise input means for the correction signals K+ and K− which effect the boost or the lowering of the useful and of the error signal. The amount of boosting and lowering is identified by the control signal $S_2$. The intermediate memory means 32 Fy for the error signals are connected to the correction computers 33 z in which the correction signals K+ and K− are formed.

The correction computers 33 z are controlled by the clock signals $T_1$ and $T_2$, whereby the index 1 identifies the subordinated and the index 2 identifies the superordinated correction step. The error signals $F_A$ and $F_B$ are supplied to the correction computer E; they are summed up in the correction computer and the sum error signal $F_{AB}$ is forwarded to the correction computer 33 G. The correction computer 33 E also comprises input means in order to process the correction signals K+ and K− from the correction computer 33 G. The sum error signal $F_{AB}$ is additionally further processed in the correction computer 33 E in that it is compared to an upper and to a lower error threshold, both of these being formed from the control signal $S_2$ (see the following FIG. 17). The correction signals K+ and K− for the intermediate memory means 32 xA and 32 xB are calculated in the correction computer 33 E from the error signals $F_A$ and $F_B$, from the correction signals K+ and K− of the correction computer 33 G, and from the control signal $S_2$. The corresponding correction signals for the intermediate memory means 32 xC and 32 xD arise in the correction computer 33 F in the same manner.

The correction computer 33 G differs from the aforementioned correction computers only in that, first, the sum error signal $F_{AB}$ and $F_{CD}$ are input in quasi fashion as partial sums instead of the error signals, for example $F_A$ and $F_B$ and that, second, there is no higher-ranking correction computer allocated to it, for which reason the sum error signal $F_{ABCD}$ formed from $F_{AB}$ and $F_{CD}$ is only internally utilized and is not forwarded and, vice versa, a correction signal K+ and K− is likewise not input.

The output signal of the described, exemplary embodiment of the inventive apparatus is the useful signal N which has been filtered in this manner.

Figure 13:
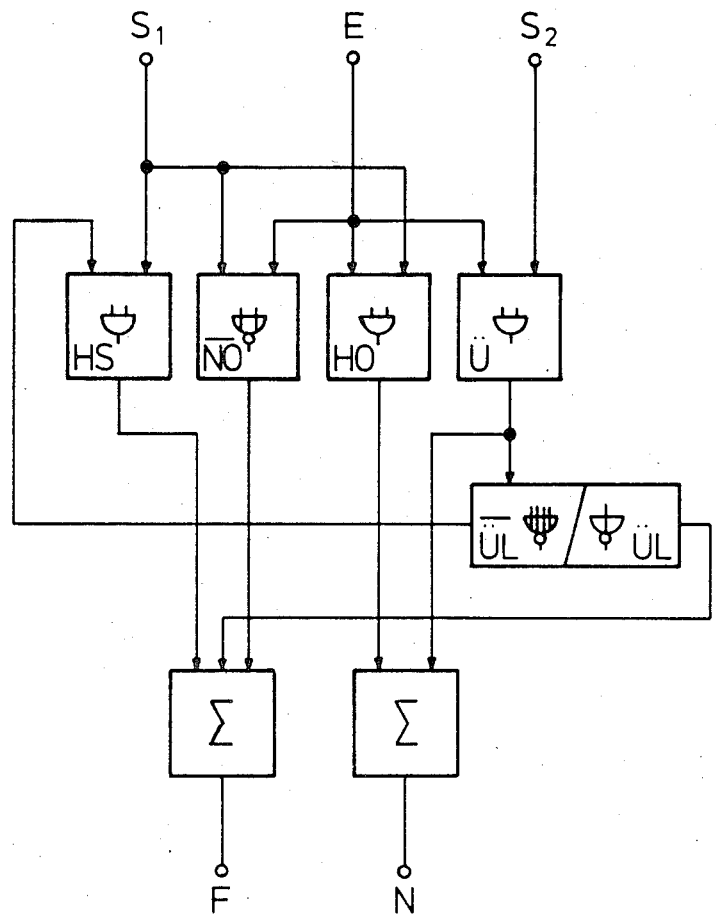
FIG. 13 is a preferred embodiment of a digital transformer.

FIG. 13 shows an exemplary embodiment of the digital transformer in FIG. 12.

The lower-order bits of the input signal E are suppressed by the control signal $S_1$ by means of an AND operation so that only the signal HO remains. For this purpose, the higher-order bits of which the useful signal should consist are identified with L in the control signal $S_1$ and the bits utilized for the correction are identified therein with 0. In the control signal $S_2$, only one bit is identified with L, this corresponding in the selected example to the least-significant bit of the useful signal, whereas all other bits are identified with 0. The carry Ü derives from the AND operation of the control signal $S_2$ and input signal E. The useful signal N arises by means of addition of the carry Ü and the signal HO.

The lower-order bits of the input signal E are also inverted by the control signal $S_1$ by means of a NOR operation, so that the signal NO arises. The auxiliary signal HS arises from the AND operation of the inverted, logical carry signal ÜL with the control signal $S_1$ so that the higher order bits therein are then identified with L in accordance with the control signal $S_1$ when, for example, the carry signal Ü does not contain a single L. The inverse logical auxiliary signal ÜL arises from the carry signal Ü by means of a multiple NOR operation. A further NOR operation leads to the invention of ÜL and produces ÜL. The error signal F is formed by means of the addition of the auxiliary signal HS, the logical carry signal ÜL, and the signal NO.

The error signal F indicates the value by which the input signal E has been modified due to the split-off of the useful signal N. A negative error signal F is represented by the cited circuit, for example, in so-called ones complement.

Figure 14A:
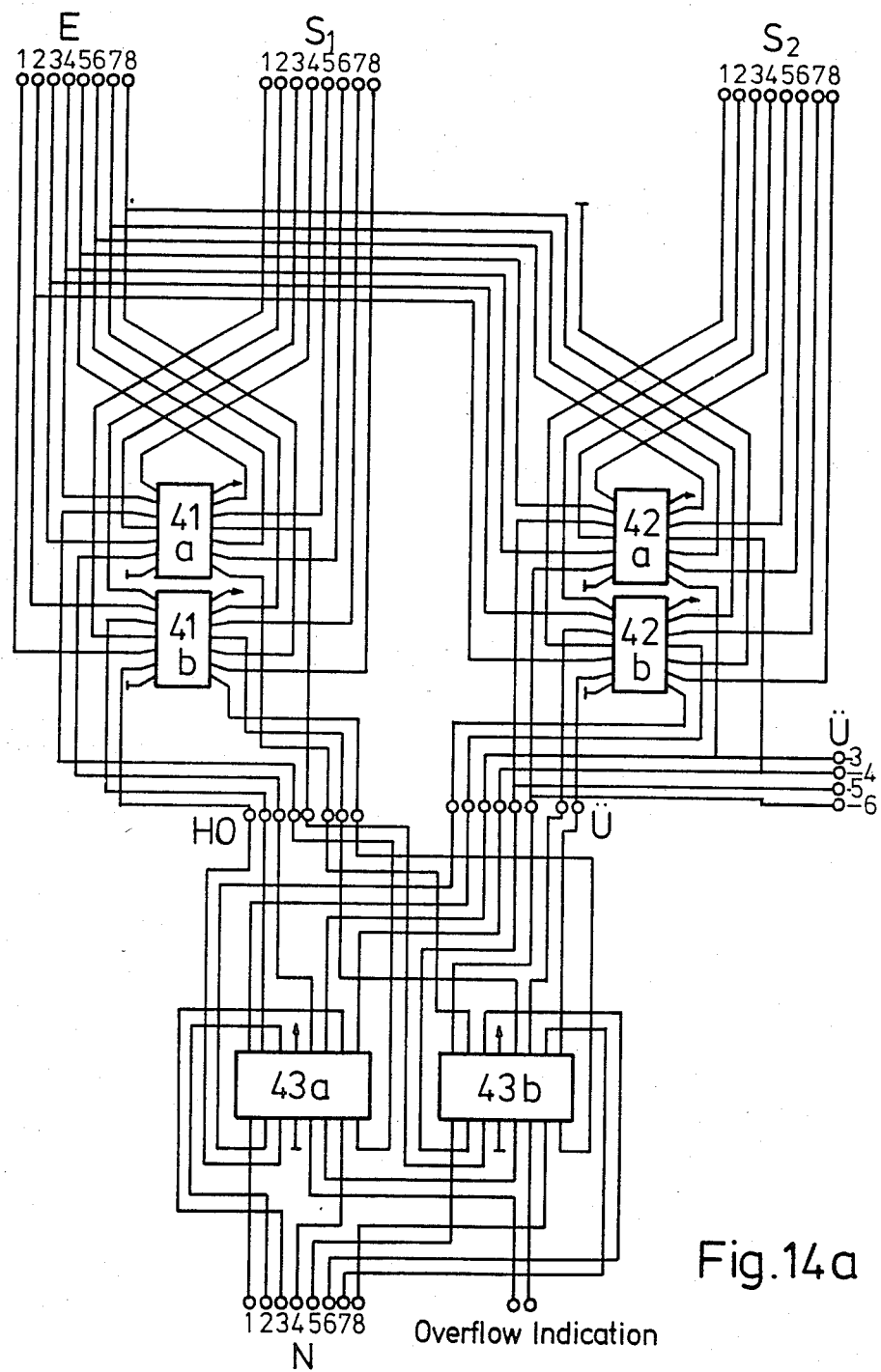
FIGS. 14a and 14b are a detailed illustration of the digital transformer according to FIG. 13.
Figure 14:
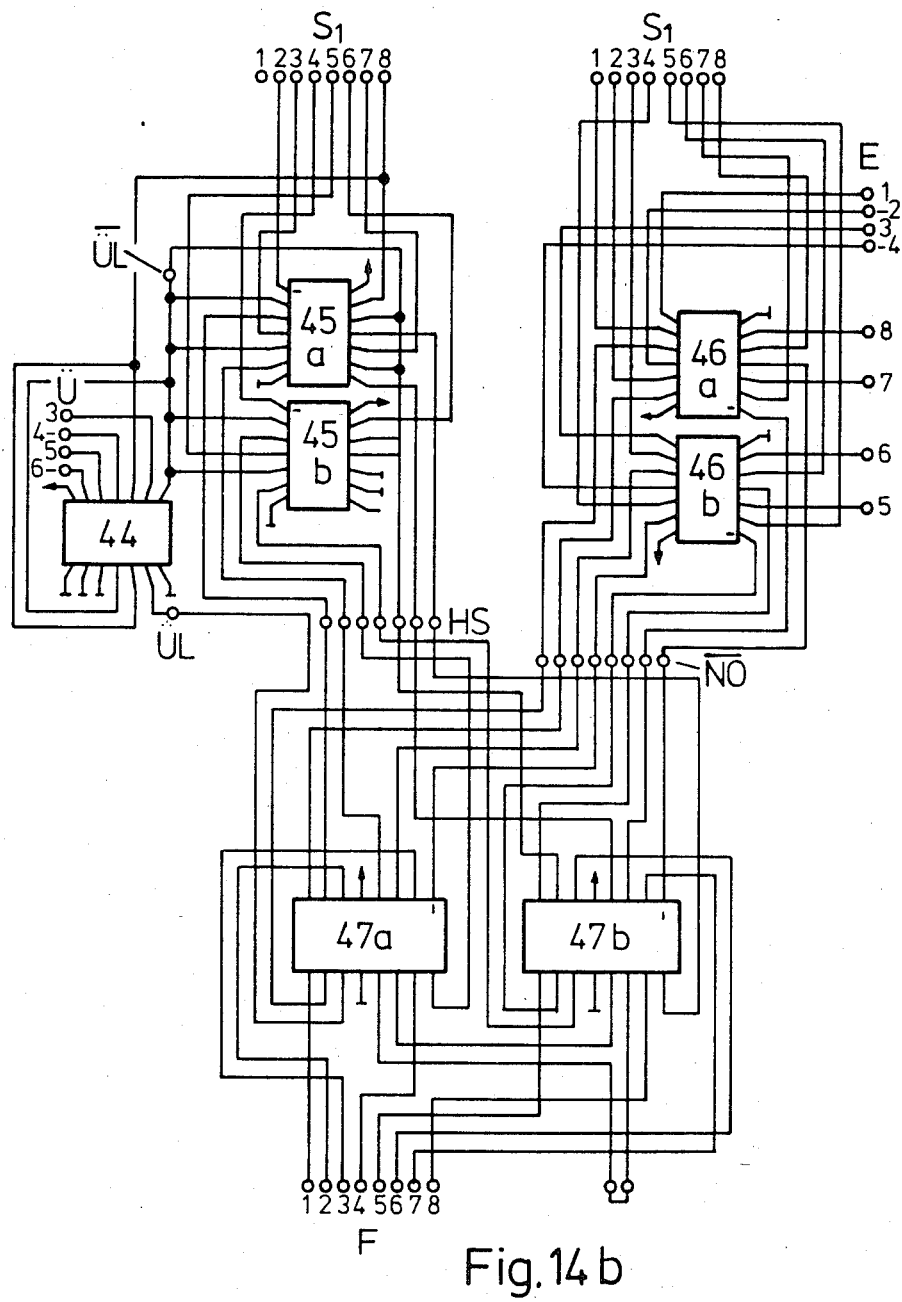

FIG. 14a shows an exemplary embodiment of the digital transformer according to FIG. 13, whereby the input signal E and the two control signals $S_1$ and $S_2$ respectively comprise 8 bits. The integrated circuits cited here and in the following are taken from "The TTL Data Book for Design Engineers", Texas Instruments Europe, Fifth European Edition, 1982, incorporated herein by reference. They are commercially available and other manufacturers' circuits having comparable properties are likewise universally accessible.

FIG. 14b shows the formation of the useful signal N from the input signal E and the control signals $S_1$ and $S_2$. The AND operations from which the signal HO arises (IC 41a and b) as well as the AND operations from which the carry signal Ü is formed (IC 42a and b) are respectively constructed with two SN47LS08. Two SN74LS83A serve as adders in which HO and Ü are added to form the useful signal N (IC 43a and b).

The calculation of the error signal F is shown in FIG. 14b. The inversion of the lower-order bits NO of the input signal E by means of control signal $S_1$ is realized by means of two SN75LS01 (IC 46a and b). Two SN 74LS08 again serve for the formation of the auxiliary signal HS from the control signal $S_1$ and the inverted logical carry signal ÜL (IC 45a and b). The inverse logical carry signal ÜL is formed in SN74LS40 (IC44) from the middle bits of the carry signal Ü and is inverted to form ÜL. The addition of HS and NO occurs by means of two SN74LS83A (IC 47a and b).

Figure 15:
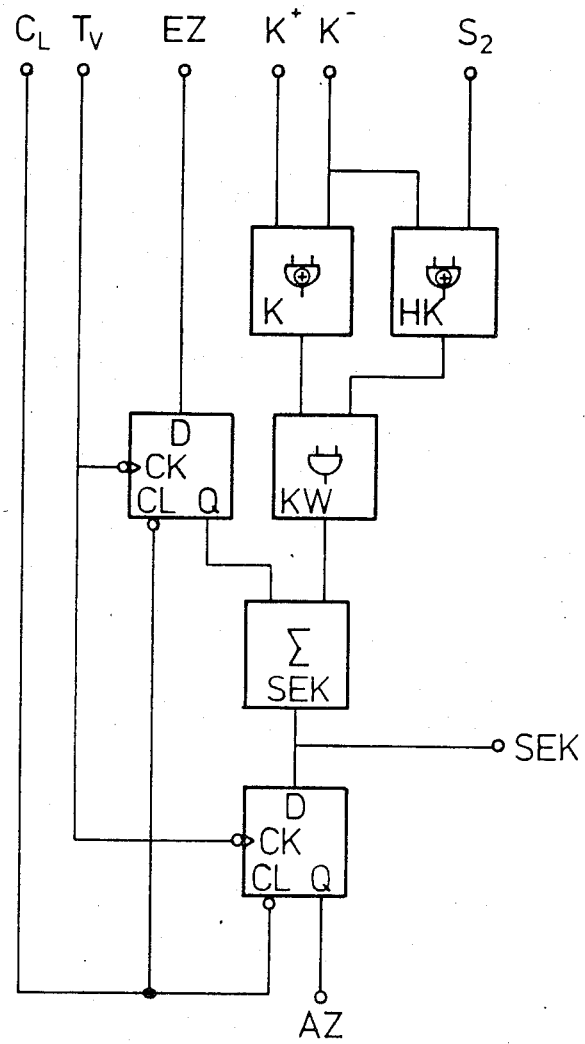
FIG. 15 is an example of an intermediate memory means.

An exemplary embodiment of the intermediate memory means 32 in FIG. 12 with input means for correction is shown in FIG. 15. The input signal EZ of the intermediate memory means is stored in the first storage cell and is forwarded in controlled fashion by the clock signal $T_v$. It proceeds directly to the adder where the correction signal KW is added to the input signal EZ.

From the adder, the sum SEK of the input signal and correction value proceeds to the second storage cell and is additionally made available as an input signal for the correction computer. The sum signal SEK is forwarded by the clock signal $T_V$ as an output signal AZ of the second intermediate memory means. Both memory means comprise additional input means for cancelling the memory content. The specified embodiment of the apparatus of the invention makes no use of this possibility. The signal CL is therefore not onwardly routed.

The correction value KW is calculated from the control signal $S_2$ and the correction signals $K^+$ and $K^-$. For this purpose, the auxiliary control signal HK is formed from the control signal $S_2$ and the correction signal $K^-$ by means of a first EXOR operation. The control signal $S_2$ is therefore inverted in case the correction signal $K^-$ is L or is not inverted in case it is 0. A second EXOR operation between the two correction signals $K^+$ and $K^-$ serves to check whether a correction is executed (K=L). This occurs when only one of the two correction signals is L. The correction value KW results from the AND operation between the correction check signal K and the auxiliary control signal HK.

Figure 16:
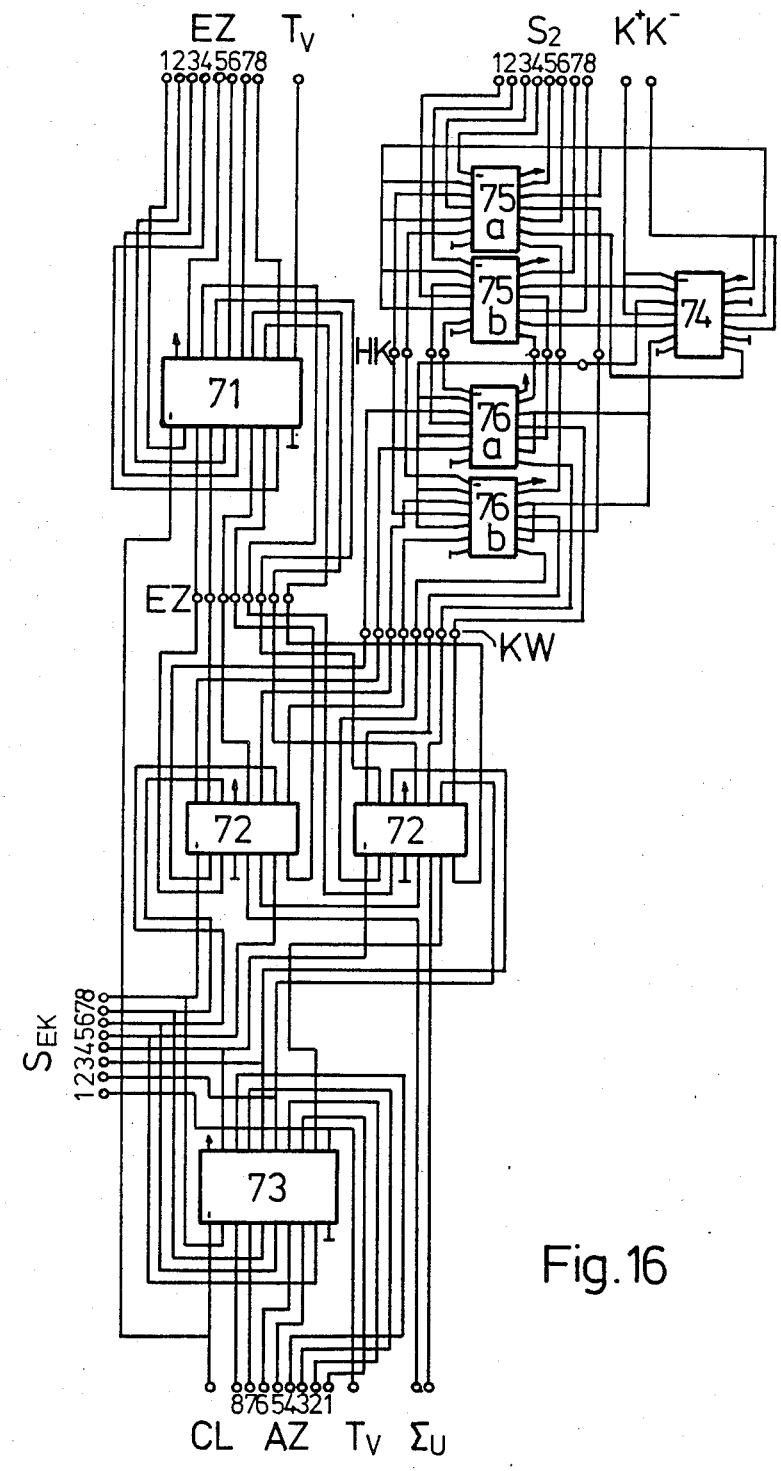
FIG. 16 is a more detailed structure of the means according to FIG. 15.

An exemplary circuit format for the intermediate memory means according to FIG. 15 is executed in FIG. 16 with TTL circuits which are commercially available. A respective SN54LS273 (IC 71 and IC 73) serves as the storage cell for the input signal and the output signal. The adder in which signal SEK is formed as input signal EZ and correction value KW consists of two ICs SN74LS83 (IC 72a and b). The EXOR operation of control signal $S_2$ and correction signal $K^-$ occurs by means of two SN74LS86 (IC 75a and b). A further for the EXOR operation of the two correction signals $K^-$ and $K^+$ as well as an impedance buffer. The AND operation, consisting of two SN74LS08 (IC 76a and b), serves for the calculation of the correction value KW from the correction check signal K and the auxiliary control signal HK.

Figure 17:
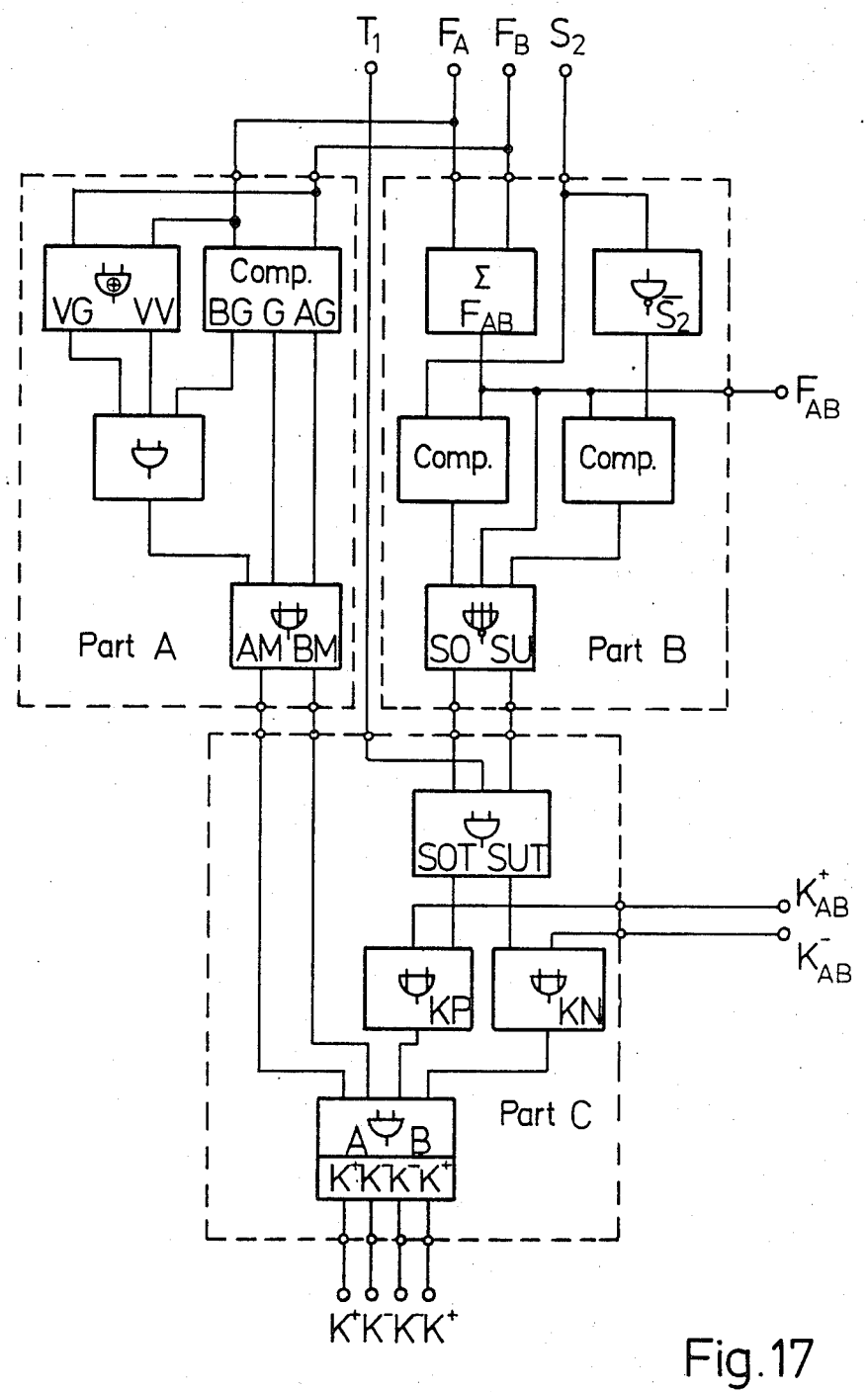
FIG. 17 is an example of a correction means according to FIG. 12.

An exemplary fundamental circuit format diagram of the correction means in FIG. 12 is shown in FIG. 17. The correction means is sub-divided into the parts A, B, and C.

Part A: A calculation is carried out in part A as to whether the error signal A has the error maximum (AM+L) or whether the error signal B is larger (BM=L). For this purpose, the error signals $F_A$ and $F_B$ are compared with one another in a comparator. The comparator indicates whether the error signal A is greater than the error signal B (AG=L), whether they are equal (G=L), or whether the error signal B is greater (BG=L). Since the executed exemplary circuits employ the so-called ones complement (see FIG. 13) for the representation of negative numbers, an additional check must be carried out whether the maximum calculated in the comparator is in fact the actual maximum. This check can occur, for example, since an EXOR operation of the operational sign bits of the two error signals $F_A$ and $F_B$ first identifies whether the operational signs are identical (VG=L) or whether they are different (VV=L), and the actual maximums are subsequently calculated with AND and OR operations which are only symbolically shown in the illustration. Thus, the error signal A is identified as a maximum with AM=L when either AG or G equal L, and VG is likewise L or when BG and VV equal L. Vice versa, the error signal B is greater and is identified with BM=L when either AG or G and VV or BG and VG equal the level L.

Part B: In part B, the sum error signal $F_{AB}$ is first formed and a check is then performed as to whether it upwardly crosses the upper threshold (SO=L) and as to whether it downwardly crosses the lower threshold (SU=L).

The sum error signal $F_{AB}$ is not only internally employed but is also made available as an output signal of the correction computer so that it can be input into a high-ranking correction computer as an input error signal.

The control signal $S_2$ serves as an upper threshold signal; the lower threshold signal $\overline{S_2}$ arises by means of inversion of signal $S_2$. The sum error signal is compared with the upper threshold signal $S_2$ in the one comparator and with the lower threshold signal $\overline{S_2}$ in the other comparator. Conditioned by the afore-mentioned representation of the negative numbers in ones complement, the conditions for the crossing of the threshold signals must be checked upon consideration of the operational sign of the sum error signal. This is possible by means of a number of NOR operations. The upper threshold is crossed (SO=L), for example, when the operational sign of the sum error signal is not negative and the sum error signal is evaluated in the comparators as being neither smaller than the upper threshold signal nor smaller than the lower threshold signal. Given crossing of the lower threshold signal, SU=L under the corresponding conditions.

Part C: Part C serves for the calculation of the correction signals $K^+$ and $K^-$ for the corresponding intermediate memory means, for example 32 NA and 32 FA as well as 32 NB and 32 FB in FIG. 12. This occurs since first the threshold signals SOT and SUT of the threshold signals SO and SU are first suppressed with the clock signal $T_1$ by means of an AND operation when no clock signal is present ($T_1=0$). Otherwise ($T_1=L$) these are forwarded to the following OR operations so that SOT=SO and SUT=SU applies. The OR operations serve for the consideration of both possibilities ($T_1=0$ and $T_1=L$), whereby the correction signals $K^+_{AB}$ and $K^-_{AB}$ can be input from a higher-ranking correction element and thereby replace the signals SOT and SUT in case these are suppressed ($T_1=0$). The signal KP is L when a correction is to occur in the positive sense. Accordingly, KN=L when the correction occurs in the negative sense. The correction signals, for example $K^+$ and $K^-$ for the intermediate memory means 32 NA and 32 FA as well as the corresponding $K^+$ and $K^-$ for the intermediate memory means 32 NB and 32 FB are calculated from the signals KP and KN as well as from the signals AM and BM by means of further AND operations. For example, the correction signal $K^-=L$ for the assemblies 32 NB and 32 FB when KN and AM have an L.

Figure 18:
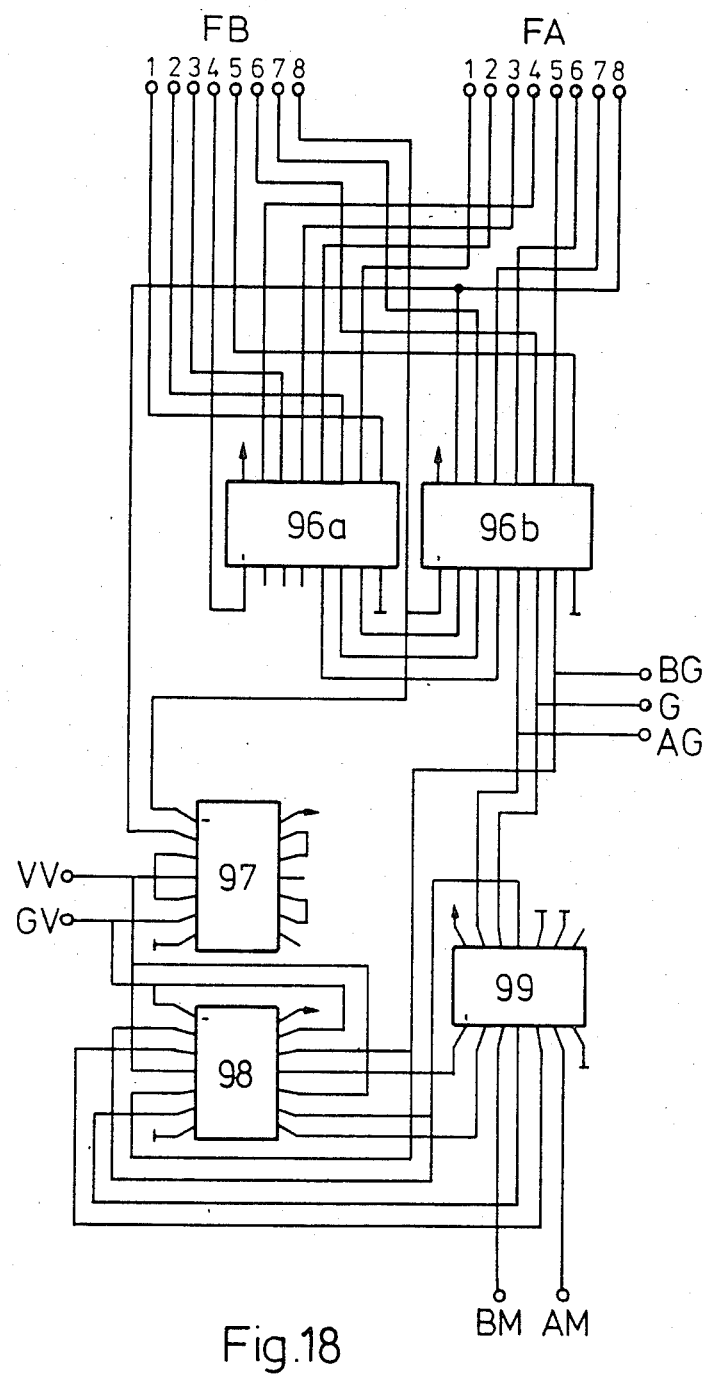
FIG. 18 is a more detailed illustration of an assembly of the correction means according to FIG. 17.
Figure 19:
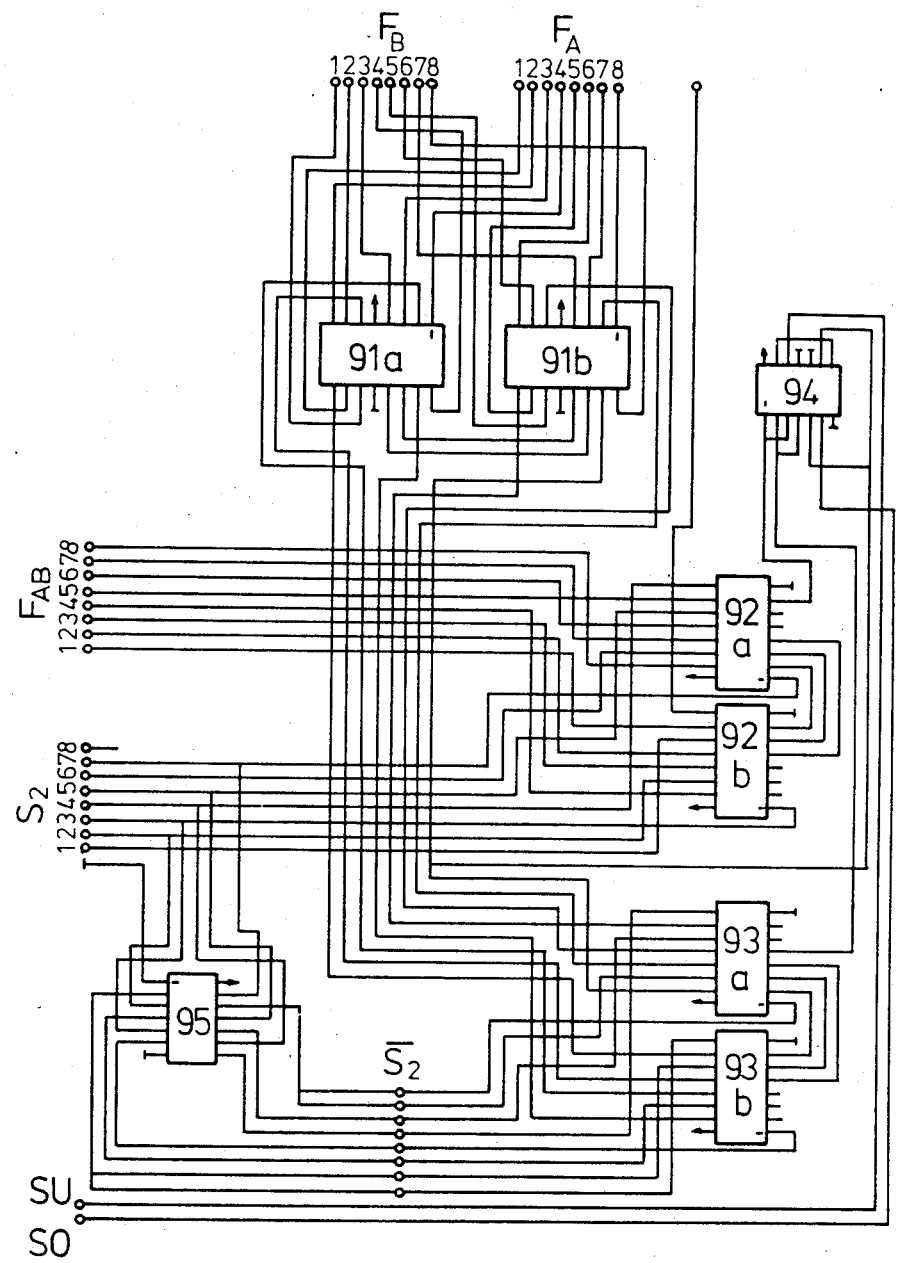
FIG. 19 is a more detailed illustration of another assembly of the correction means according to FIG. 17.

The part A of the correction computer according to FIG. 17 is executed by way of example in FIG. 18. The comparator (IC 96 a and b) for the comparison of the error signals $F_A$ and $F_B$ consists of two SN74LS85. The signals VG and VV of the operational sign comparison are generated by means of two EXOR gates of SN74LS86 (IC 97); the remaining TTL circuits comprise the AND gates SN74LS08 (IC 98) and the OR gates SN74LS32 (IC 99) by means of which the signals AM and BM are calculated in accordance with the equations described above.

Part B of the correction computer according to FIG. 17 is executed by way of example in FIG. 18. The error signals $F_A$ and $F_B$ are added by means of two SN74LS83 (IC 91 a and b); the sum error $F_{AB}$ is transferred to the two comparators and is made available as an output signal for higher-ranking correction computers. The two comparators (IC 92 a and b as well as IC 93 a and b) consist of two respective SN74LS85. The inversion (IC 95) of the control signal $S_2$ occurs by means of the TTL circuit SN74LS04. The conditions for the crossing of the upper and of the lower error threshold are checked in SN74LS27 (IC 94) which makes the signals SO and SU available for the part C of this correction computer.

Figure 20:
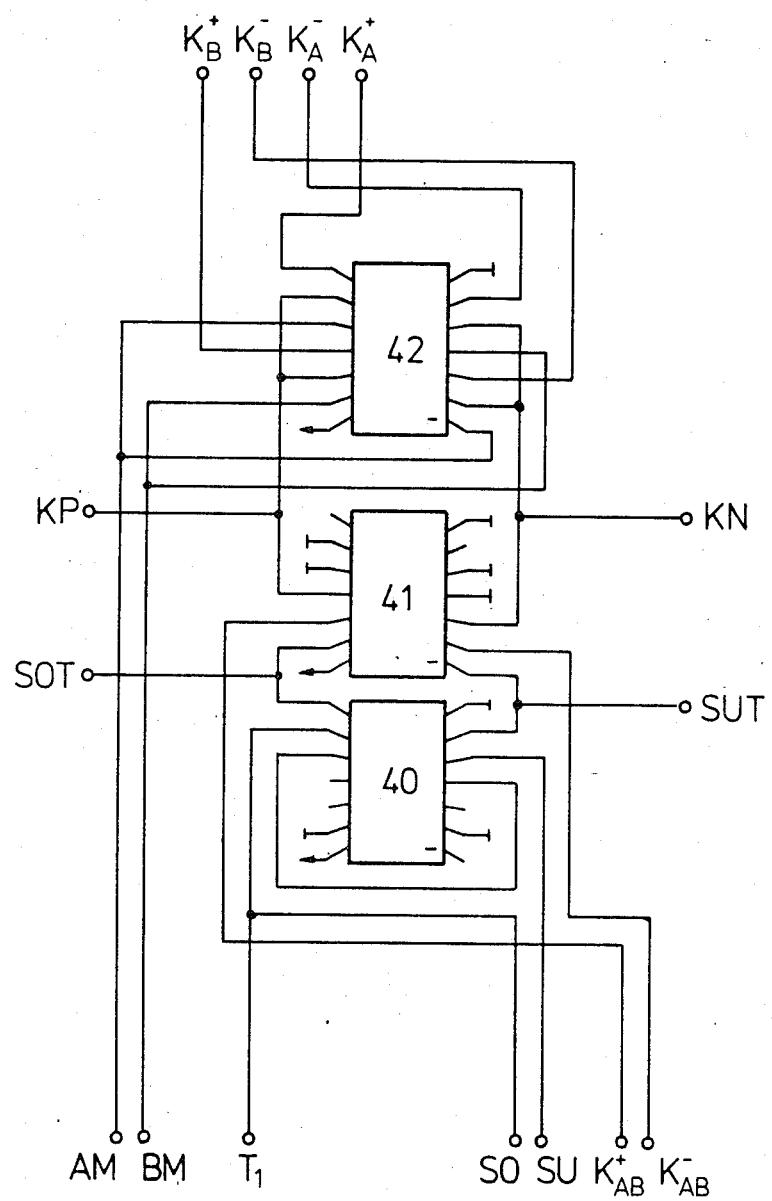
FIG. 20 is a more detailed illustration of a further assembly of the correction means according to FIG. 17.

FIG. 20 finally shows the exemplary execution of part C of the correction computer according to FIG. 17.

The signals SU and SO of part B of the correction computer are combined in SN74LS08 (IC 40) with the clock signal $T_1$, whereby the signals SUT and SOT arise. These are in IC SN74LS32 (IC 41) with the correction signals $K^-{}_{AB}$ and $K^+{}_{AB}$ which are taken from a higher-ranking correction computer when this exists so that the signals KN and KP arise. These are combined in the final SN74LS08 (IC 42) with the signals AM and BM, and the correction signals $K^+$ and $K^-$ for the processing stages A and B are thus obtained as the output signal of part C of the correction computer.

Figure 21:
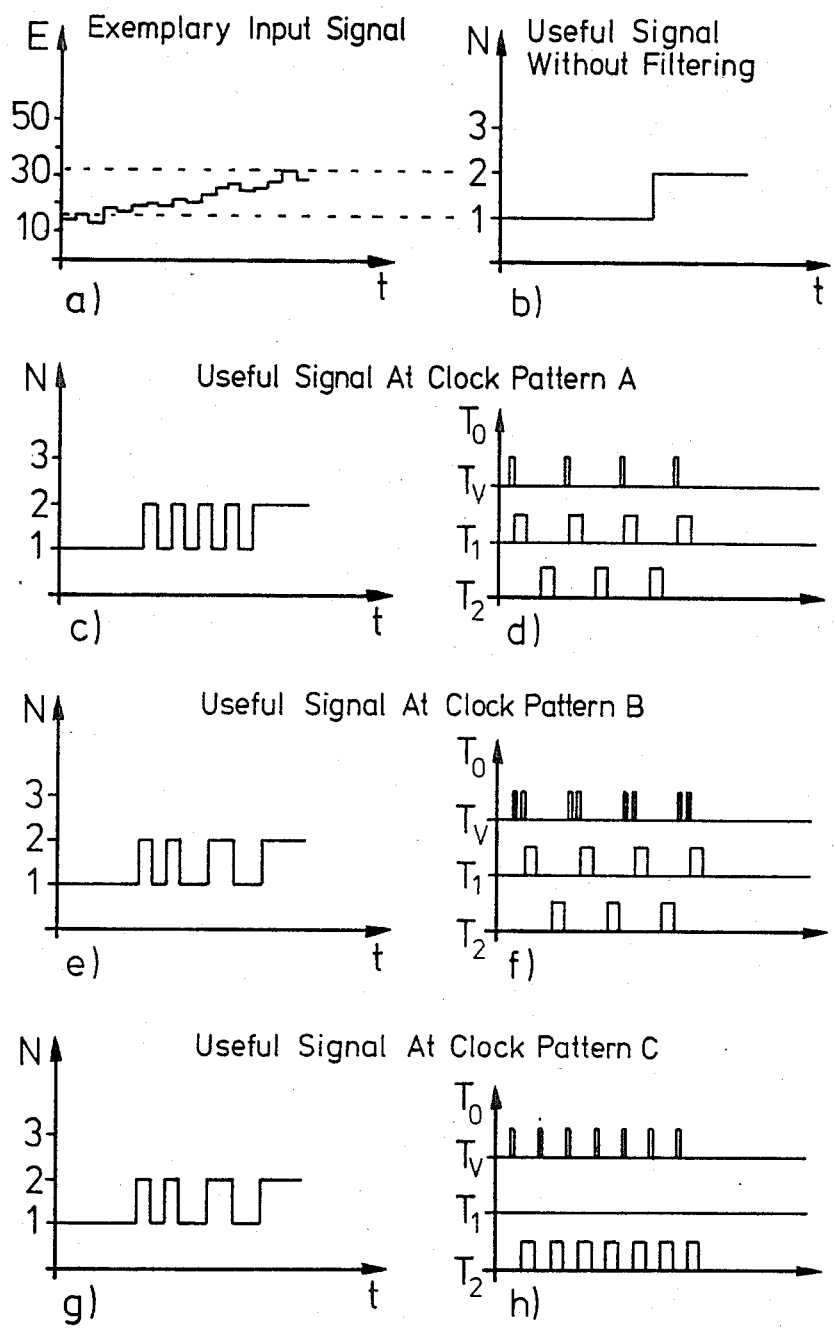
FIG. 21 is an illustrative application of the apparatus of the invention.

FIG. 21 shows an illustrative application of the apparatus of the invention. An exemplary input signal having 8-bit graduation would yield the useful signal shown at the top right without filtering, given split-off of the four low-order bits. As a consequence of the rather coarse signal graduation, (only amounting to four bits for the useful signal) this useful signal deviates considerably from the input signal. Accordingly, the transition region between the digital levels of the useful signal completely disappears. This unsatisfactory condition could only be alleviated if the input signal were so noiseinfested that the useful signal would skip from the one to the other digital level in the transition region under discussion, whereby a pulse frequency modulation would arise.

The filtering method of the invention leads to the desired pulse frequency modulation in the addressed transition region and is distinguished since this pulse frequency modulation is generated independently of the noise component of the input signal. In its exemplary embodiment according to FIG. 12, the apparatus of the invention comprises the clock inputs $T_\nu$, $T_1$, and $T_2$. The transfer and forwarding of useful and error signals into the intermediate memory means 32 xy is controlled by the clock signal $T_\nu$. The clock signal $T_1$ is allocated to the lower-ranking correction stage and $T_2$ is allocated to the higher-ranking correction stage. Since the clock signals are externally input into the apparatus of the invention, the filter effect of this means is controllable for each clock pattern. The filter effect is illustrated for exemplary clock patterns A, B, and C.

After the transfer of the useful and error signals by the clock signal $T_\nu$, the filtering in the clock pattern A is first executed by the lower-ranking correction stage with $T_1$ and is subsequently executed by the higher-ranking correction stage with $T_2$. Due to the following clock signal $T_\nu$, the now-filtered useful signal N is forwarded, on the one hand, to the last intermediate memory means (32 ND in FIG. 3) and on the other hand, the next useful signal N and the corresponding error signal F are also read into the first intermediate memory devices 32 xA, whereas the remaining useful and error signals are only internally shifted. The clock pattern A thus effects a filtration whereby the signals are "singly shifted through the filter chain".

In clock pattern B, by contrast, every second correction operation consisting of $T_1$ and $T_2$ is eliminated, whereby the signals are filtered in blocks of two signals, respectively. Due to the elimination of correction operations, consequently it is not the individual signal values, but blocks of signal values that are filtered. The length of these blocks is controllable by the clock signal $T_\nu$.

In clock pattern C, finally the correction step of the lower-ranking correction stage is respectively eliminated. As a result thereof, the signals are individually shifted through, whereby the inventive filtering method is here respectively applied to groups of four signal values (in comparison to two signal values in clock pattern A).

The clock signals $T_\nu$, $T_1$ and $T_2$ can also be combined in some other form. Thus, for example, the clock sequence $T_\nu, T_\nu, T_2$ would cause the filtering to be respectively applied to four signal values, whereby the processing would occur in blocks of two signal values.

The best filter effect is achieved with clock pattern A, whereas the other filter diagrams enable accelerated processing.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for minimizing errors in digital processing of electrical signals, comprising the steps of:
    transforming digital input signals into digital useful signals and associated digital error signals, each of the digital useful signals having a lower resolution than the corresponding input signal, and said error signal indicating deviation of the useful signal from the input signal;
    defining a group of digital useful signals and adding together the corresponding digital error signals to create an error sum;
    checking whether the error sum crosses a prescribed upper or lower threshold;
    if the threshold is crossed, changing the value of one of the digital uesful signals of said group, redetermining the digital error signal corresponding to said changed useful signal, and recalculating the error sum by adding together the digital error signal of the group; and
    rechecking to see whether the error sum crosses the upper or lower threshold.

2. A methpd according to claim 1 wherein the digital useful signal whose value is changed when the error sum crosses the upper or lower threshold is that digital useful signal of the group which has a corresponding digital error signal which contributes the most to the error sum of the group.

3. A method according to claim 1 including the steps of dividing said group into a plurality of sub-groups of digital useful signals, calculating corresponding error sums for each of said sub-groups from the corresponding digital error signals, checking the error sum of each sub-group to determine whether it crosses an upper or lower threshold, changing a value of one of the digital useful signals in the respective sub-group if its corresponding error sum crosses the upper or lower threshold, recalculating the digital error signals for the respective sub-groups if necessary and rechecking said error sums against said upper or lower threshold values.

4. A method according to claim 3 including the step of finally combining the error sums of the respective sub-groups to determine an error sum of said group and checking said error sum against an upper or lower threshold value.

5. A method according to claim 3 including the step of first correcting a digital useful signal value of a sub-group having the greatest deviation of its error sum from the upper or lower threshold value.

6. A method for minimizing errors in digital processing of electrical signals, comprising the steps of:
   transforming digital input signals into useful signals and associated digital error signals, each of the digital useful signals having a lower resolution than the corresponding input signal, and said error signal indicating deviation of the useful signal from the input signal;
   defining a group of digital useful signals and adding together the corresponding digital error signals to create an error sum;
   identifying whether the error sum of the group of useful signals crosses a prescribed upper or lower threshold, and if it does, dividing the group into sub-groups, calculating sum errors for each of the sub-groups, determining the sub-group whose respectively calculated sum error is a greatest sum error relative to an upper or lower threshold and identifying a useful signal within said identified sub-group which has a greatest error relative to an upper or lower threshold, and correcting the identified useful signal in the identified sub-group so that a sum error of the identified sub-group no longer is as great relative to the threshold and so that an overall sum error of the group as a whole no longer crosses the respective prescribed upper or lower threshold to which the group is being compared.

7. A method according to claim 1 including a the step of utilizing said digital useful signals for recording raster.

8. A method according to claim 1 wherein the useful signal values used for recording and the digital input signals are the density values resulting from a scanning of a raster.

9. A method for minimizing errors in a process wherein a plurality of points are scanned, each point having an associated density level within a given range, and where in recording points are provided with each point having a density level in a range which is smaller than the density level range of the scanned points, comprising the steps of:
   grouping a plurality of the density levels corresponding to a group of the scanned points and for each of said density levels transforming them into a corresponding group of density levels for the recording points and also calculating an absolute error for each of said density levels to be recorded with respect to the corresponding scanned point density level so as to create a group of absolute errors;
   adding together the absolute errors of the group to create an accumulated error sum; and
   comparing said error sum to a threshold value and if the threshold value is crossed, changing one of the density levels to be recorded so as to reduce the overall error sum, and then recalculating the error sum.

10. A method for minimizing errors in digital processing of electrical signals, comprising the steps of:
    transforming a digital input signal into a digital useful signal, said digital useful signal having a lower resolution than the input signal, and a digital error signal also being associated with the digital useful signal indicative of deviation of the useful signal from the input signal;
    defining a group of useful signals and a corresponding group of error signals;
    storing a corresponding error signal of a first useful signal;
    forming a sub-group within said group by selecting a neighboring second useful signal and adding its corresponding error signal to the stored error signal and assigning the second useful signal to the sub-group; and
    under given conditions, assigning further useful signals to said sub-group so that finally a stored sum error of said sub-group crosses a prescribed threshold so that this sub-group is then complete, and then creating following further sub-groups in a same manner until all signal values of said group are assigned to the sub-groups.

11. A method for minimizing errors in digital processing of electrical signals, comprising the steps of:
    transforming a digital input signal into a digital useful signal and a digital error signal, said digital useful signal having a lower resolution than the the input signal, and said digital error signal associated with the digital useful signal being indicative of deviation of the useful signal from the input signal;
    defining a group of useful signals with their corresponding error signal;
    storing a corresponding error signal of a first useful signal;
    selecting a neighboring second useful signal and performing a check to see whether its signal value is approximately the same as a signal value of the first useful signal and, when this is the case, adding the error signal of the second useful signal to the stored error signal of the first useful signal and assigning the second useful signal to this sub-group, and when the two signal values are not approximately the same, assigning the second useful signal value to a different sub-group; and
    terminating identification of further useful signals having approximately the signal level of the first useful signal when a stored value corresponding to a sum error of all error signals in the sub-group crosses a prescribed threshold whereupon this sub-group is complete, and forming following sub-groups in a same manner until all signal values of the group are assigned to a sub-group.

12. An apparatus for minimizing errors in digital processing of electrical signals, comprising:
    signal evaluation circuit means connected to digital input signals for transforming each of said digital input signals having a relatively high resolution into a useful signal having a relatively lower resolution than said input signal and also into an error signal representative of an erroneous deviation of the useful signal from the input signal;

a first intermediate memory means for storing each of said useful signals connected to said evaluation circuit means and which further comprises input means in order to selectively modify a stored useful signal with a correction signal;

a second intermediate memory means for storing said corresponding error signals and which is connected to an adder means for providing an error sum of the error signals stored in the second intermediate memory means;

first and second threshold level means connected to the adder means for comparing the error sum to respective upper and lower thresholds; and if one of the thresholds is crossed by the error sum, circuit means for changing a signal value of one of the useful signals so as to reduce its contributing error signal to the overall error sum so that the error sum no longer crosses one of the two threshold levels.

13. An apparatus according to claim 12 wherein the signal value of the useful signal which is changed is that useful signal whose error signal contributes most to the error sum.

* * * * *